United States Patent
Kayahara et al.

(10) Patent No.: US 7,407,288 B2
(45) Date of Patent: Aug. 5, 2008

(54) EYE-FLOW GUIDING LEVEL CALCULATING SYSTEM, EYE-FLOW GUIDING LEVEL CALCULATING PROGRAM, AND EYE-FLOW GUIDING LEVEL CALCULATING METHOD

(75) Inventors: Naoki Kayahara, Chino (JP); Atsushi Nagahara, Chino (JP)

(73) Assignee: Seiko Epson Corporation, Tokyo (JP)

( * ) Notice: Subject to any disclaimer, the term of this patent is extended or adjusted under 35 U.S.C. 154(b) by 431 days.

(21) Appl. No.: 10/973,921

(22) Filed: Oct. 27, 2004

(65) Prior Publication Data

US 2005/0131653 A1    Jun. 16, 2005

(30) Foreign Application Priority Data

Oct. 29, 2003 (JP) .............................. 2003-369236
Oct. 29, 2003 (JP) .............................. 2003-369238
Aug. 27, 2004 (JP) .............................. 2004-248382

(51) Int. Cl.
    *A61B 3/14* (2006.01)
(52) U.S. Cl. ...................... 351/208; 382/103
(58) Field of Classification Search ................ 351/209, 351/208; 382/103

See application file for complete search history.

(56) References Cited

U.S. PATENT DOCUMENTS 5,231,674 A * 7/1993 Cleveland et al. ............ 382/117
6,601,021 B2 * 7/2003 Card et al. ................... 702/187

FOREIGN PATENT DOCUMENTS

| JP | A 06-000162 | 1/1994 |
| JP | A 2000-050051 | 2/2000 |
| JP | A 2002-175290 | 6/2002 |

* cited by examiner

*Primary Examiner*—Hung X. Dang
*Assistant Examiner*—Joseph Martinez
(74) *Attorney, Agent, or Firm*—Oliff & Berridge, PLC

(57) ABSTRACT

Exemplary embodiments of the invention provide an eye-flow guiding level calculating system which can plan miniaturization and low cost of a device and surely obtain a suitable eye flow. A layout device, first, detects each vertex of an image object as guiding reference points, based on vector image data. And then, for every guiding reference point, two auxiliary lines are virtually formed to intersect the guiding reference point along an outline of the image object. Subsequently, the direction in which a bisector line of an obtuse angle among angles, made by the virtual auxiliary lines, extends outward from the guiding reference point is calculated as an eye-flow guiding direction. Further, for every guiding reference point, the distance from the center G of the image object up to the guiding reference point is calculated as an eye-flow guiding intensity. According to this construction, it is possible to quantitatively calculate in which direction the image object tends to guide the eye-flow.

11 Claims, 22 Drawing Sheets

```
<?xml version="1.0" encoding="UTF-8"?>
<!DOCTYPE svg PUBLIC "-//W3C//DTD SVG 1.0//EN"
"http://www.w3.org/TR/2001/REC-SVG-20010904/DTD/svg10.dtd">
<svg width="45mm" height="26mm" viewBox="0 0 4500 2600">
  <g style="stroke:none;fill:rgb(0,0,0)">
    <polygon points="2,1 2,5 5,7 2,1"/>
  </g>
</svg>
```

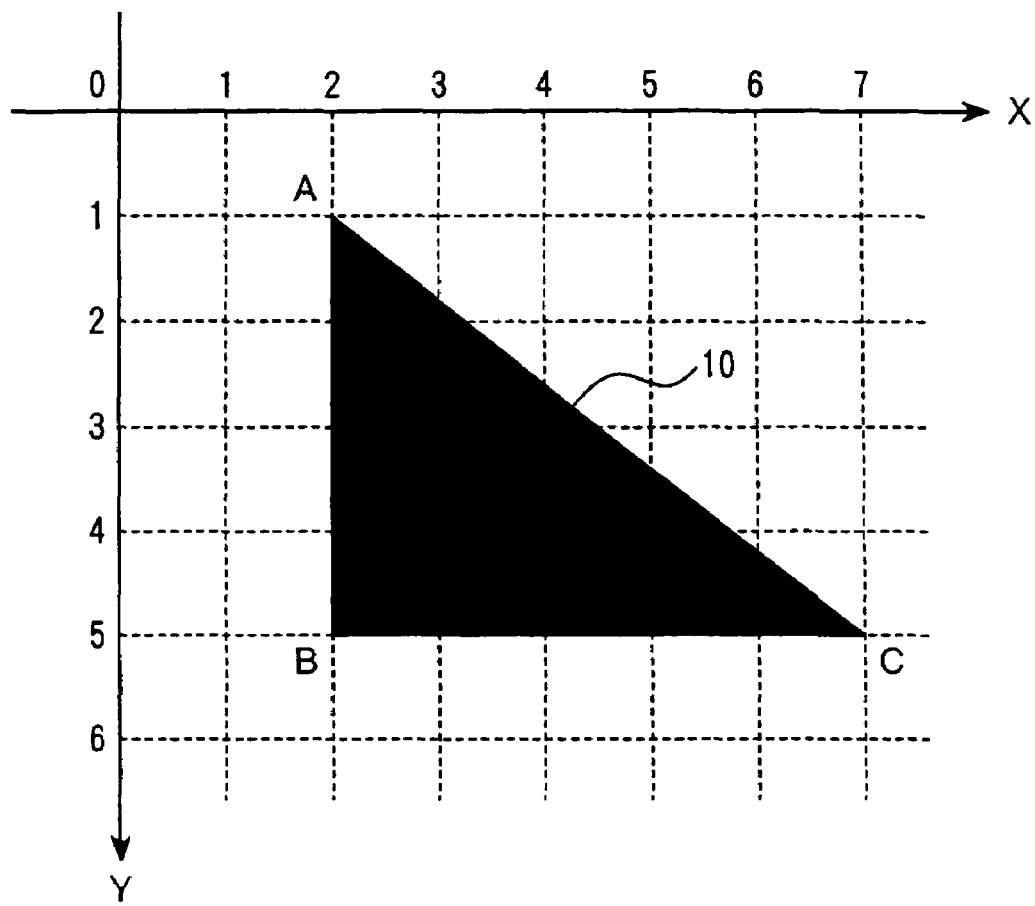

| GUIDING REFERENCE POINT | EYE-FLOW GUIDING DIRECTION | EYE-FLOW GUIDING INTENSITY |
|---|---|---|
| A (2, 1) | (-0.53, -0.85) | 3.14 |
| B (2, 5) | (-0.78, 0.62) | 2.13 |
| C (7, 5) | (0.93, 0.37) | 3.59 |

| GUIDING REFERENCE POINT | LINEAR EQUATION OF EYE-FLOW GUIDING DIRECTION | LINEAR EQUATION OF OPPOSITE SIDELINE | INTERSECTION POINT OF TWO STRAIGHT LINES |
|---|---|---|---|
| A (2, 1) | $y = 1.6x - 2.2$ | $y = 5$ | A' (4.5, 5) |
| B (2, 5) | $y = -0.8x + 6.6$ | $y = 0.8x - 0.6$ | B' (4.5, 3) |
| C (7, 5) | $y = 0.4x + 2.2$ | $x = 2$ | C' (2, 3) |

| GUIDING REFERENCE POINT | INTERSECTION POINT OF TWO STRAIGHT LINES | BOSOM DISTANCE |
|---|---|---|
| A (2, 1) | (4.5, 5) | 4.72 |
| B (2, 5) | (4.5, 3) | 3.20 |
| C (7, 5) | (2, 3) | 5.38 |

| GUIDING REFERENCE POINT | EYE-FLOW GUIDING DIRECTION | EYE-FLOW GUIDING INTENSITY |
|---|---|---|
| A (2, 1) | (-0.53, -0.85) | 4.72 |
| B (2, 5) | (-0.78, 0.62) | 3.20 |
| C (7, 5) | (0.93, 0.37) | 5.38 |

FIG. 24

FIG. 29
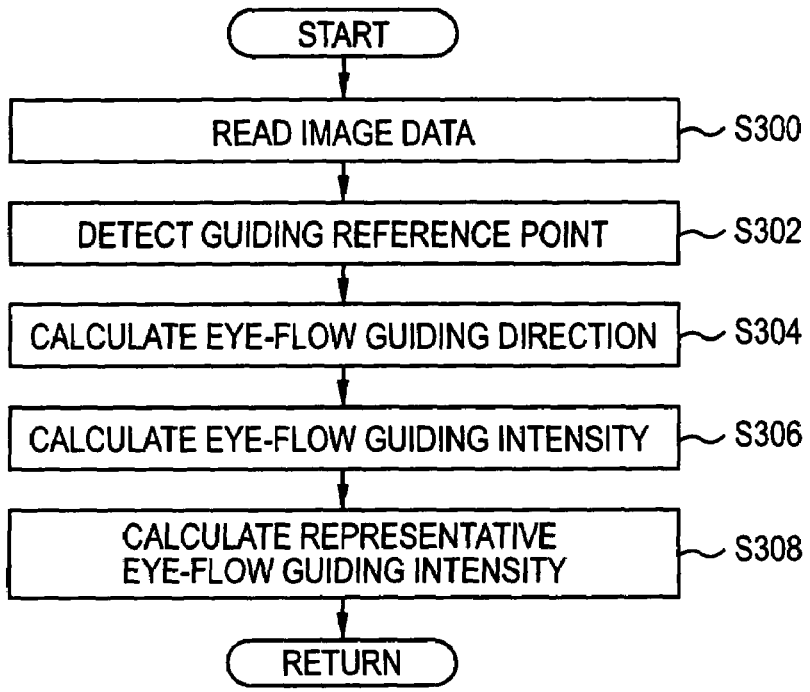
FIG. 30
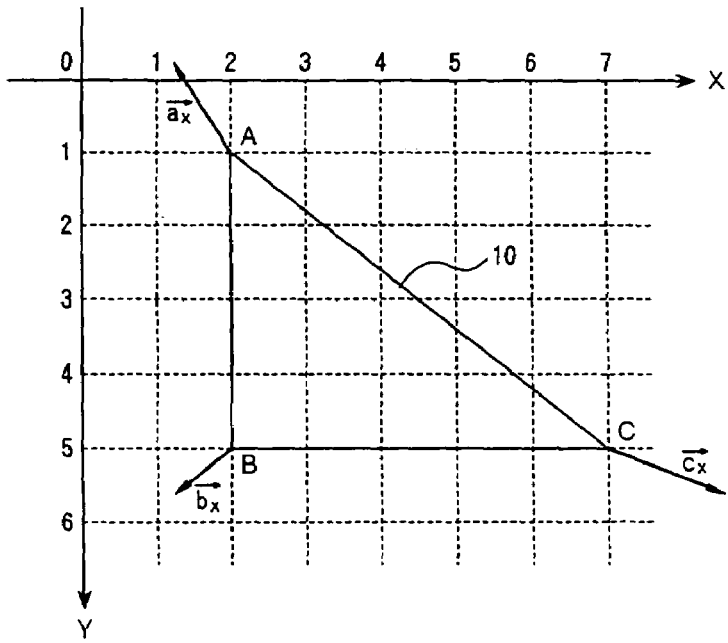
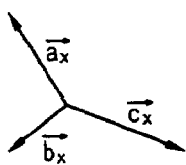

| GUIDING REFERENCE POINT | EYE-FLOW GUIDING DIRECTION | EYE-FLOW GUIDING INTENSITY | EYE-FLOW GUIDING VECTOR |
|---|---|---|---|
| A (2, 1) | (-0.53, -0.85) | 3.14 | $\vec{a_x}$ (-1.6642, -2.669) |
| B (2, 5) | (-0.78, 0.62) | 2.13 | $\vec{b_x}$ (-1.6615, 1.3206) |
| C (7, 5) | (0.93, 0.37) | 3.59 | $\vec{c_x}$ (3.3387, 1.3283) |

(GUIDING REFERENCE POINT)

(GUIDING REFERENCE POINT)

(GUIDING REFERENCE POINT)

[GUIDING REFERENCE POINT]

[GUIDING REFERENCE POINT]

[GUIDING REFERENCE POINT]

EYE-FLOW GUIDING LEVEL CALCULATING SYSTEM, EYE-FLOW GUIDING LEVEL CALCULATING PROGRAM, AND EYE-FLOW GUIDING LEVEL CALCULATING METHOD

BACKGROUND OF THE INVENTION

1. Field of Invention

Exemplary embodiments of the present invention relates to a system, a program, and a method of calculating a degree of guiding an eye-flow of an image. More specifically, exemplary embodiments of the present invention relate to an eye-flow guiding level calculating system, an eye-flow guiding level calculating program, and to an eye-flow guiding level calculating method, capable of miniaturizing system devices and decreasing the cost thereof, while effectively enabling a suitable eye flow for the eye-flow of images.

2. Description of Related Art

Like a typical consumer catalog of goods, a document having an optimum layout design, in which layout elements (for example, a title, an image, and a text) are arranged to be readily noticeable, is commonly referred to as a "visual document." The creation of the visual documents requires a significant amount of specialized knowledge, and thus it is difficult for an average person to create the visual documents. For this reason, in most cases the creation of the visual documents is entrusted to professional graphic designers having a specialized expertise and experience.

Generally, when a designer creates a visual document, the semantically consecutive layout elements are typically arranged in the readable direction in which the eye-flow of a reader flows (hereinafter, referred to as an eye flow), whereby a readily readable layout is realized. For example, if one article includes of a title, an image, and a text, preferably, the image and the text are arranged in a sequence corresponding to the eye flow. Therefore, when the designer arranges the layout elements, the predicable eye flow is anticipated and the layout elements are arranged accordingly. That is, the designer creates the final layout through repetitive trials and errors. Since the designer usually predicts the eye flow based on intuition or experience, it is difficult to quantitatively predict the anticipated eye flow.

The related art discloses techniques for detecting the eye flow. Related art techniques include a document design evaluation system disclosed in Japanese Unexamined Patent Application Publication No. 2002-175290, an eye-flow information analyzing device disclosed in Japanese Unexamined Patent Application Publication No. 6-162, and an image recognizing device disclosed in Japanese Unexamined Patent Application Publication No. 2000-50051.

In the invention disclosed in Japanese Unexamined Patent Application Publication No. 2002-175290, a system of evaluating the design of web pages includes a web data receiving unit to receive data of a web page to be evaluated, an eye-flow information receiving unit to receive eye-flow information of a user viewing the web page, and a design evaluating unit to evaluate the design of the web page based on web data received by the web data receiving unit and eye-flow information received by the eye-flow information receiving unit.

In the invention disclosed in Japanese Unexamined Patent Application Publication No. 6-162, the movement of eye is detected by an eye movement detecting device, the time sequential change of eye detected by an analyzing device is analyzed in a frequency region, and the contents of an image to be displayed, which is inputted from an image input unit, is analyzed in a display content analyzing device. Further, both of them are combined in a combined analyzing unit, and thus highly reliable data with respect to the observable mental state of a test subject and an objective evaluation for the image is obtained.

In the invention disclosed in Japanese Unexamined Patent Application Publication No. 2000-50051, when an object manuscript for direction recognition is a manuscript D2 in which white letters are expressed on a highly concentrated background image, created histograms H3 and H4 are inverted to form histograms H1 and H2. And then, based on the inverted histograms, the recognition of a manuscript direction is performed.

SUMMARY OF THE INVENTION

However, in the inventions described in Japanese Unexamined Patent Application Publication No. 2002-175290 and Japanese Unexamined Patent Application Publication No. 6-162, since the eye flow is detected using an apparatus, such as a camera, there are problems in that the process requires large-scale devices and a high cost is required. Further, in the case in which the designer performs the layout while detecting his eye flow with the inventions described in Japanese Unexamined Patent Application Publication No. 2002-175290 and Japanese Unexamined Patent Application Publication No. 6-162, it is common that the designer will be too familiar with the layout by repeatedly viewing the similar layout results, or that he is only conscious of the eye flow that he himself expects. Accordingly, it is likely that when a third party views the same layout for the first time, the actual eye flow detected differs from the designer's eye flow. Here, the designer intends to realize a readable layout to be seen for the first time by a typical target reader. Thus, it is desirable for the designer to have an eye flow of a person viewing the layout result for the first time. Therefore, when the designer performs the layout through his own eye flow, it is difficult to predict an actual eye flow of the target readers. Thus, there is a problem in that it is difficult to realize a readable layout.

Further, in the invention described in Japanese Unexamined Patent Application Publication No. 6-162, the correspondence of the amount of image features extracted from the image of the visual document to the amount of eye-flow features of eye-flow movements measured with a measuring apparatus can be made. And then, after storing the results of the correspondence, even if the amount of image features is given, it is possible to predict the amount of eye-flow features based on the given amount of image features and the established correspondence.

In such a method adopted to establish correspondence, a suitable eye flow can be obtained if the given amount of image features matches the established correspondence. However, if the given amount of image features does not match the established correspondence, a suitable eye flow cannot be obtained. For this reason, there is a problem in that, even after establishing many correspondences, a sufficient reliability cannot be obtained.

Further, in the invention described in Japanese Unexamined Patent Application Publication No. 2000-50051, determining whether an image is in the vertical direction or the horizontal direction does not contribute to the detection by the eye flow.

Therefore, exemplary embodiments of the present invention are made in view of the problems in the related art, and it is an object of exemplary embodiments of the present invention to provide an eye-flow guiding level calculating system, an eye-flow guiding level calculating program, and to an eye-flow guiding level calculating method, capable of miniaturizing system devices and decreasing the cost thereof, while effectively enabling a suitable eye flow for the eye-flow of images.

In applying an eye flow to a layout, first, with respect to one layout element, it is necessary to quantitatively obtain in which direction the layout element tends to guide an eye-flow.

The present inventors have repeated examination earnestly and have discovered that, in case of observing an image object having a projection, there are features in a human sense that an eye-flow tends to be guided toward the projection from the inside of the image object (direction feature), and the larger the degree of sharpness of the projection is, the more the eye-flow tends to be guided (intensity feature). Therefore, the inventors have concluded that, if the degree of guiding the eye-flow is obtained based on the feature that the eye-flow is guided in a predetermined direction and a predetermined size from a point in the vicinity of the vertex of the projection as a reference, it is possible to quantitatively obtain in which direction the layout element tends to guide the eye-flow.

Further, when the layout is performed on a plurality of layout elements, the direction of guiding the eye-flow may plurally exist in one layout element. In this case, since the layout should be performed in consideration of all the directions, it can be expected that a layout operation is complicated. For this reason, it is preferable to obtain in which direction the layout elements as a whole tend to guide the eye-flow.

Exemplary Embodiment 1

In order to attain the above-mentioned object, according to the exemplary embodiment 1 of the invention, there is an eye-flow guiding level calculating system in which, based on image data constituting an image, a degree of guiding an eye-flow of the image is calculated. The eye-flow guiding level calculating system includes: a guiding reference point detecting device to, based on the image data, detect a guiding reference point serving as a reference which guides the eye-flow from the image; and an eye-flow guiding level calculating device to calculate an eye-flow guiding level indicating the degree of guiding the eye-flow with respect to the guiding reference point detected by the guiding reference point detecting device.

In doing so, the guiding reference point is detected from the image based on the image data by the guiding reference point detecting device, and the eye-flow guiding level is calculated with respect to the detected guiding reference point by the eye-flow guiding level calculating device.

According to this construction, it is possible to calculate quantitatively and relatively suitably in which direction the image tends to guide the eye-flow. Thus, it has an advantage that it is possible to obtain quantitatively a relatively suitable eye flow, as compared with the related art. Further, since it is not necessary to provide an additional apparatus, such as a camera, the device does not have a large scale, and high cost is not required. Thus, it has an advantage that it is possible to plan miniaturization and low cost of the device, as compared with the related art. In addition, since a method, such as a study, is not used to calculate the eye-flow guiding level, it has also an advantage that it is possible to obtain relatively surely the suitable eye flow.

Here, the present system may be implemented with a single device, terminal, or other apparatus, or it may be implemented with a network system in which a plurality of devices, terminals, or other apparatuses are communicatably connected to each other. In the latter, the respective elements may belong to any one of a plurality of apparatuses, as long as it is communicatably connected to other elements. Hereinafter, the same is applied to an eye-flow guiding level calculating program of the exemplary embodiment 10.

Exemplary Embodiment 2

In order to attain the above-mentioned object, according to the exemplary embodiment 2 of the invention, there is an eye-flow guiding level calculating system in which, based on image data constituting an image, a degree of guiding an eye-flow of the image is calculated. The eye-flow guiding level calculating system includes: a guiding reference point detecting device to, based on the image data, detect a plurality of guiding reference points serving as references which guide the eye-flow from the image; an eye-flow guiding level calculating device to calculate an eye-flow guiding level indicating the degree of guiding the eye-flow for every guiding reference point detected by the guiding reference point detecting device; and a representative eye-flow guiding level calculating device to calculate a representative eye-flow guiding level representing the image based on the eye-flow guiding levels calculated by the eye-flow guiding level calculating device.

If doing so, the plurality of guiding reference points are detected from the image based on the image data by the guiding reference point detecting device, and for every detected guiding reference point, the eye-flow guiding level is calculated by the eye-flow guiding level calculating device. And then, based on the calculated eye-flow guiding levels, the representative eye-flow guiding level is calculated by the representative eye-flow guiding level calculating device.

According to this construction, it is possible to calculate quantitatively and relatively suitably in which direction the image tends to guide the eye-flow. Thus, it has an advantage that it is possible to obtain quantitatively a relatively suitable eye flow, as compared with the related art. Further, since it is possible to calculate the representative eye-flow guiding level representing the image, it has an advantage that, when a plurality of layout elements is arranged to perform layout, it is possible to relatively simply perform a layout operation. Further, since it is not necessary to provide an additional apparatus, such as a camera, the device does not have a large scale, and high cost is not required. Thus, it has an advantage that it is possible to the plan miniaturization and low cost of the device, as compared with the related art. In addition, since a method, such as a study, is not used to calculate the eye-flow guiding level, it has also an advantage that it is possible to relatively surely obtain the suitable eye flow.

Here, the representative eye-flow guiding calculating device may have any construction as long as it calculates the representative eye-flow guiding level based on the eye-flow guiding levels calculated by the eye-flow guiding level calculating device. For example, if the eye-flow guiding levels calculated by the eye-flow guiding level calculating device have a direction and a size, it is possible to calculate the representative eye-flow guiding level by performing the vector composition of the eye-flow guiding levels of the respective guiding reference points, which is the same as an eye-flow guiding level calculating program of the exemplary embodiment 11 of the invention.

Here, the present system may be implemented with a single device, terminal, or other apparatus, or it may be implemented with a network system in which a plurality of devices, terminals, or other apparatuses are communicatably connected to each other. In the latter, the respective elements may belong to any one of a plurality of apparatuses, as long as it is communicatably connected to other elements. Hereinafter, the same is applied to an eye-flow guiding level calculating program of the exemplary embodiment 11 of the invention.

Exemplary Embodiment 3

Further, in the eye-flow guiding level calculating system of the exemplary embodiment 3 according to the exemplary embodiment 1 or 2 of the invention, the guiding reference point detecting device detects a vertex of a projection or its vicinity in the image as the guiding reference points, based on the image data.

According to this structure, based on the image data, the vertex of the projection or its vicinity in the image is detected as the guiding reference point by the guiding reference point detecting device.

In the case in which the image object having the projection is included in the image, the eye-flow tends to be guided from the inside of the image object toward the projection. Therefore, by detecting the vertex of the projection as the guiding reference point, it has an advantage that it is possible to further suitably calculate in which direction the image tends to guide the eye-flow.

Here, the guiding reference point detecting device detects the vertex of the projection or its vicinity in the image as the guiding reference point. From the viewpoint of obtaining a suitable eye flow, it is preferable to detect the vertex of the projection as the guiding reference point. However, in the case in which it is difficult to specify the vertex of the projection or an eye flow is obtained at low precision from the viewpoint of a reduction in the amount of calculation, the vicinity of the vertex of the projection may be detected as the guiding reference point within a range without causing an unsuitable eye flow.

Further, in the present specification, as regards the vicinity of the vertex of the projection, it is assumed that, as loose tolerance range, 'less than a half of sideline' is included in the range of the vicinity. That is because, if the range of the vicinity exceeds the half of sideline, it is not understood to which vertex the reference point relates. When the direction and the size of the guiding level are represented by a figure having a direction or a length such as an arrow, the more preferable tolerance range may be set depending on the figure such as an arrow. For example, if the figure is an arrow, the range of a line width of the arrow to the vertex is set to the vicinity. Further, if the direction is represented by a triangle, the range of a width of a sideline of the triangle toward the vertex corresponding to the reference point is set to the vicinity. If such a range is set, it becomes easy to perceive the reference point at the time of actual display.

Exemplary Embodiment 4

Further, in the eye-flow guiding level calculating system of the exemplary embodiment 4 according to any one of the exemplary embodiments 1 to 3 of the invention, the eye-flow guiding level calculating device has eye-flow guiding direction calculating device to calculate an eye-flow guiding direction, which is a direction of guiding the eye-flow, with respect to the guiding reference point detected by the guiding reference point detecting device, and eye-flow guiding intensity calculating device to calculate an eye-flow guiding intensity, which is the intensity of guiding the eye-flow, with respect to the guiding reference point detected by the guiding reference point detecting device.

According to this structure, the eye-flow guiding direction is calculated with respect to the detected guiding reference point by the eye-flow guiding direction calculating device, and the eye-flow guiding intensity is calculated with respect to the detected guiding reference point by the eye-flow guiding intensity calculating device. Thus, it becomes possible to calculate the eye-flow guiding direction and the eye-flow guiding intensity as the eye-flow guiding level.

In the case in which the image object having the projection is included in the image, the eye-flow tends to be guided in a predetermined direction and a predetermined size from a point in the vicinity of the vertex of the projection as a reference. Therefore, by calculating the eye-flow guiding direction and the eye-flow guiding intensity as the eye-flow guiding level, it has an advantage that it is possible to further suitably calculate in which direction the image tends to guide the eye-flow.

Exemplary Embodiment 5

Further, in the eye-flow guiding level calculating system of the exemplary embodiment 5 according to the exemplary embodiment 4 of the invention, on the assumption that two auxiliary lines are formed to intersect the guiding reference point or its vicinity along the edge of the image passing through the guiding reference point or its vicinity, the eye-flow guiding direction calculating device calculates the eye-flow guiding direction based on the central direction of an obtuse angle among angles which the virtual auxiliary lines make.

According to this structure, on the assumption that two auxiliary lines are formed to intersect the guiding reference point or its vicinity along the edge of the image passing through the guiding reference point or its vicinity, it becomes possible to calculate the eye-flow guiding direction based on the central direction of the obtuse angle among the angles which the virtual auxiliary lines make.

Therefore, since it is possible to calculate a direction from the inside of the image object toward the vertex of the projection as the eye-flow guiding direction, it has an advantage that it is possible to further suitably calculate in which direction the image tends to guide the eye-flow.

Here, on the assumption that the virtual auxiliary lines are formed to intersect the guiding reference point or its vicinity along the edge of the image, the eye-flow guiding direction calculating device calculates the eye-flow guiding direction. From the viewpoint of obtaining the suitable eye flow, preferably, on the assumption that the virtual auxiliary lines are formed to intersect the guiding reference point along the edge of the image, the eye-flow guiding direction is preferably calculated. However, in the case in which it is difficult to form the auxiliary lines intersecting the guiding reference point on calculation or an eye flow is obtained in low precision from the viewpoint of a reduction in the amount of calculation, on the assumption that the virtual auxiliary lines are formed to intersect the vicinity of the guiding reference point along the edge of the image, the eye-flow guiding direction may be calculated within the range without causing the unsuitable eye flow.

Exemplary Embodiment 6

Further, in the eye-flow guiding level calculating system of the exemplary embodiment 6 according to the exemplary embodiment 4 or 5 of the invention, the eye-flow guiding intensity calculating device calculates the eye-flow guiding intensity based on a distance, up to the guiding reference point, from the center of the image object whose outline is formed to include the edge of the image passing through the guiding reference point or its vicinity.

According to this structure, it becomes possible to calculate the eye-flow guiding intensity based on the distance, up to the guiding reference point, from the center of the image object whose outline is formed to include the edge of the image passing through the guiding reference point or its vicinity.

The larger the degree of sharpness of the projection in the image object is, the more the eye-flow tends to be guided. Further, the larger the degree of sharpness is, the larger the distance from the center of the image object up to the guiding reference point is. Therefore, since it is possible to calculate the eye-flow guiding intensity depending on the degree of sharpness of the projection in the image object, it has an advantage that it is possible to further suitably calculate in which direction the image tends to guide the eye-flow.

Here, the image object means a region having an outline in the image, and the region may be a closed region or an opened region. Hereinafter, the same is applied to the eye-flow guiding level calculating system of the exemplary embodiment 7 or 8 of the invention.

Exemplary Embodiment 7

Further, in the eye-flow guiding level calculating system of the exemplary embodiment 7 according to any one of the exemplary embodiments 4 to 6 of the invention, in an image object which is formed to include a vertex of an image serving as the guiding reference point or a vertex of an image in the vicinity of the guiding reference point, on the assumption that an auxiliary line is formed to pass through a vertex other than the vertex serving as the guiding reference point or other than the vertex in the vicinity of the guiding reference point, the eye-flow guiding intensity calculating device calculates the eye-flow guiding intensity based on a distance from one point on the virtual auxiliary line up to the guiding reference point.

According to this structure, in an image object which is formed to include a vertex of an image serving as the guiding reference point or a vertex of an image in the vicinity of the guiding reference point, on the assumption that an auxiliary line is formed to pass through a vertex other than the vertex serving as the guiding reference point or other than the vertex in the vicinity of the guiding reference point, the eye-flow guiding intensity is calculated based on the distance from one point on the virtual auxiliary line up to the guiding reference point by the eye-flow guiding intensity calculating device.

The larger the degree of sharpness of the projection in the image object is, the more the eye-flow tends to be guided. Further, the larger the degree of sharpness is, the larger the distance from one point on the virtual auxiliary line up to the guiding reference point is. Therefore, since it is possible to calculate the eye-flow guiding intensity depending on the degree of sharpness of the projection in the image object, it has an advantage that it is possible to further suitably calculate in which direction the image tends to guide the eye-flow.

Here, the virtual auxiliary line passing through the vertex other than the vertex corresponding to the guiding reference point may include a line connecting vertexes or a circular arc passing through a vertex at the time when a circumscribed circle of the image object is considered.

Exemplary Embodiment 8

In the eye-flow guiding level calculating system of the exemplary embodiment 8 according to any one of the exemplary embodiments 4 to 6 of the invention, on the assumption that two auxiliary lines are formed to intersect the guiding reference point or its vicinity along the edge of an image passing through the guiding reference point or its vicinity, the eye-flow guiding intensity calculating device calculates the eye-flow guiding intensity based on a distance, up to the guiding reference point, from a point at which a bisector line of an acute angle among angles which the virtual auxiliary lines make intersects an outer line of an image object whose outline is formed to include the edge.

According to this structure, on the assumption that the two auxiliary lines are formed to intersect the guiding reference point or its vicinity along the edge of the image passing through the guiding reference point or its vicinity, the eye-flow guiding intensity can be calculated by the eye-flow guiding intensity calculating device, based on the distance, up to the guiding reference point, from the point at which the bisector line of the acute angle among the angles which the virtual auxiliary lines make intersects the outer line of the image object whose outline is formed to include the edge.

The larger the degree of sharpness of the projection in the image object is, the more the eye-flow tends to be guided. Further, the larger the degree of sharpness is, the larger the distance, up to the guiding reference point, from the point at which the bisector line of the acute angle among the angles which the virtual auxiliary lines make intersects the outer line of the image object is. Therefore, since it is possible to calculate the eye-flow guiding intensity depending on the degree of sharpness of the projection in the image object, it has an advantage that it is possible to further suitably calculate in which direction the image tends to guide the eye-flow.

Here, on the assumption that the virtual auxiliary lines are formed to intersect the guiding reference point or its vicinity along the edge of the image, the eye-flow guiding intensity calculating device calculates the eye-flow guiding intensity. From the viewpoint of obtaining the suitable eye flow, on the assumption that the virtual auxiliary lines are formed to intersect the guiding reference point along the edge of the image, the eye-flow guiding intensity is preferably calculated. However, in the case in which it is difficult to form the auxiliary lines intersecting the guiding reference point on calculation or an eye flow is obtained in low precision from the viewpoint of a reduction in the amount of calculation, on the assumption that the virtual auxiliary lines are formed to intersect the vicinity of the guiding reference point along the edge of the image, the eye-flow guiding direction may be calculated within the range without causing the unsuitable eye flow. Hereinafter, the same is applied to the eye-flow guiding level calculating system of the aspect 9 of the invention.

Exemplary Embodiment 9

Further, in the eye-flow guiding level calculating system of the exemplary embodiment 9 according to any one of the exemplary embodiments 4 to 6 and 8 of the invention, on the assumption that two auxiliary lines are formed to intersect the guiding reference point or its vicinity along the edge of an image passing through the guiding reference point or its vicinity, the eye-flow guiding intensity calculating device calculate the eye-flow guiding intensity based on angles which the virtual auxiliary lines make.

According to this structure, on the assumption that two auxiliary lines are formed to intersect the guiding reference point or its vicinity along the edge of an image passing through the guiding reference point or its vicinity, the eye-flow guiding intensity can be calculated by the eye-flow guiding intensity calculating device, based on angles which the virtual auxiliary lines make.

The larger the degree of sharpness of the projection in the image object is, the more the eye-flow tends to be guided.

Further, the larger the degree of sharpness is, the smaller the angles which the virtual auxiliary lines make are. Therefore, since it is possible to calculate the eye-flow guiding intensity depending on the degree of sharpness of the projection in the image object, it has an advantage that it is possible to further suitably calculate in which direction the image tends to guide the eye-flow.

Exemplary Embodiment 10

Meanwhile, in order to attain the above-mentioned object, there is provided an eye-flow guiding level calculating program in which, based on image data constituting an image, a degree of guiding an eye-flow of the image is calculated. The calculating program includes a program for allowing a computer to execute: a guiding reference point detecting program for detecting based on the image data, a guiding reference point serving as a reference which guides the eye-flow from the image; and an eye flow guiding level calculating program for calculating an eye-flow guiding level indicating the degree of guiding the eye-flow with respect to the guiding reference point detected in the guiding reference point detecting.

According to this structure, the computer reads out the program and executes the steps according to the read program. And then, the same advantages as those in the eye-flow guiding level calculating system of the exemplary embodiment 1 can be obtained.

Exemplary Embodiment 11

In order to attain the above-mentioned object, there is provided an eye-flow guiding level calculating program in which, based on image data constituting an image, a degree of guiding an eye-flow of the image is calculated. The calculating program includes a program for allowing a computer to execute: a guiding reference point detecting program for detecting based on the image data, a plurality of guiding reference points serving as references which guide the eye-flow from the image; an eye flow guiding level calculating program for calculating step of calculating an eye-flow guiding level indicating the degree of guiding the eye-flow for every guiding reference point detected in the guiding reference point detecting; and representative eye flow guiding level calculating program for calculating a representative eye-flow guiding level representing the image based on the eye-flow guiding levels calculated in the eye-flow guiding level calculating.

According to this structure, the computer reads out the program and executes the steps according to the read program. And then, the same advantages as those in the eye-flow guiding level calculating system of the exemplary embodiment 2 can be obtained.

Exemplary Embodiment 12

Further, in the eye-flow guiding level calculating program of exemplary embodiment 12 according to the exemplary embodiment 10 or 11 of the invention, in the guiding reference point detecting, based on the image data, a vertex of a projection or its vicinity in the image is detected as the guiding reference point.

According this structure, the computer reads out the program and executes the steps according to the read program. And then, the same advantages as those in the eye-flow guiding level calculating system of the exemplary embodiment 3 of the invention can be obtained.

Exemplary Embodiment 13

Further, in the eye-flow guiding level calculating program of exemplary embodiment 13 according to any one of the exemplary embodiments 10 to 12 of the invention, the eye-flow guiding level calculating includes calculating an eye-flow guiding direction, which is a direction of guiding the eye-flow, with respect to the guiding reference point detected in the guiding reference point detecting, and calculating an eye-flow guiding intensity, which is the intensity of guiding the eye-flow, with respect to the guiding reference point detected in the guiding reference point detecting.

According to this structure, the computer reads out the program and executes the steps according to the read program. And then, the same advantages as those in the eye-flow guiding level calculating system of the exemplary embodiment 4 of the invention can be obtained.

Exemplary Embodiment 14

Further, in the eye-flow guiding level calculating program of the exemplary embodiment 14 according to the exemplary embodiment 13 of the invention, in the eye-flow guiding direction calculating, on the assumption that two auxiliary lines are formed to intersect the guiding reference point or its vicinity along the edge of the image passing through the guiding reference point or its vicinity, the eye-flow guiding direction is calculated based on the central direction of an obtuse angle among angles which the virtual auxiliary lines make.

According to this structure, the computer reads out the program and executes according to the read program. And then, the same advantages as those in the eye-flow guiding level calculating system of the exemplary embodiment 5 of the invention can be obtained.

Exemplary Embodiment 15

Further, in the eye-flow guiding level calculating program of the exemplary embodiment 15 according to the exemplary embodiment 13 or 14 of the invention, in the eye-flow guiding intensity calculating, the eye-flow guiding intensity is calculated based on a distance, up to the guiding reference point, from the center of an image object whose outline is formed to include the edge of the image passing through the guiding reference point or its vicinity.

According to this structure, the computer reads out the program and executes the steps according to the read program. And then, the same advantages as those in the eye-flow guiding level calculating system of the exemplary embodiment 6 can be obtained.

Exemplary Embodiment 16

Further, in the eye-flow guiding level calculating program of the exemplary embodiment 16 according to any one of the exemplary embodiments 13 to 15 of the invention, in the eye-flow guiding intensity calculating, in an image object which is formed to include a vertex of an image serving as the guiding reference point or a vertex of an image in the vicinity of the guiding reference point, on the assumption that an auxiliary line is formed to pass through a vertex other than the vertex serving as the guiding reference point or other than the vertex in the vicinity of the guiding reference point, the eye-flow guiding intensity is calculated based on a distance from one point on the virtual auxiliary line up to the guiding reference point.

According to this structure, the computer reads out the program and executes the steps according to the read program. And then, the same advantages as those in the eye-flow guiding level calculating system of the exemplary embodiment 7 can be obtained.

Exemplary Embodiment 17

Further, in the eye-flow guiding level calculating program of the exemplary embodiment 17 according to any one of the exemplary embodiments 13 to 15 of the invention, in the eye-flow guiding intensity calculating, on the assumption that two auxiliary lines are formed to intersect the guiding reference point or its vicinity along the edge of an image passing through the guiding reference point or its vicinity, the eye-flow guiding intensity is calculated based on a distance, up to the guiding reference point, from a point at which a bisector line of an acute angle among angles which the virtual auxiliary lines make intersects an outer line of an image object whose outline is formed to include the edge.

According to this structure, the computer reads out the program and executes the steps according to the read program. And then, the same advantages as those in the eye-flow guiding level calculating system of the exemplary embodiment 8 can be obtained.

Exemplary Embodiment 18

In the eye-flow guiding level calculating program of the exemplary embodiment 18 according to any one of the exemplary embodiments 13 to 15 and 17 of the invention, in the eye-flow guiding intensity calculating, on the assumption that two auxiliary lines are formed to intersect the guiding reference point or its vicinity along an edge of an image passing through the guiding reference point or its vicinity, the eye-flow guiding intensity is calculated based on angles which the virtual auxiliary lines make.

According to this structure, the computer reads out the program and executes according to the read program. And then, the same advantages as those in the eye-flow guiding level calculating system of the exemplary embodiment 9 can be obtained.

Exemplary Embodiment 19

Meanwhile, in order to attain the above-mentioned object, according to the exemplary embodiment 19 of the invention, there is provided an eye-flow guiding level calculating method in which, based on image data constituting an image, a degree of guiding an eye-flow of the image is calculated. The method includes detecting based on the image data, a guiding reference point serving as a reference which guides the eye-flow from the image, and calculating an eye-flow guiding level indicating the degree of guiding the eye-flow with respect to the guiding reference point detected by the guiding reference point detecting.

According to this construction, the same advantages as those in the eye-flow guiding level calculating system of the exemplary embodiment 1 can be obtained.

Exemplary Embodiment 20

Meanwhile, in order to attain the above-mentioned object, according to the exemplary embodiment 20 of the invention, there is provided an eye-flow guiding level calculating method in which, based on image data constituting an image, a degree of guiding an eye-flow of the image is calculated.

The method includes: detecting based on the image data, a plurality of guiding reference points serving as references which guide the eye-flow from the image; calculating an eye-flow guiding level indicating the degree of guiding the eye-flow for every guiding reference point detected in the guiding reference point detecting; and calculating a representative eye-flow guiding level representing the image based on the eye-flow guiding levels calculated in the eye-flow guiding level calculating.

According to this construction, the same advantages as those in the eye-flow guiding level calculating system of the exemplary embodiment 2 of the invention can be obtained.

Here, in the representative eye-flow guiding calculating, any method may be used as long as it calculates the representative eye-flow guiding level based on the eye-flow guiding levels calculated in the eye-flow guiding level calculating. For example, if the respective eye-flow guiding levels calculated by the eye-flow guiding level calculating have a direction and a size, it is possible to calculate the representative eye-flow guiding level by performing the vector composition of the eye-flow guiding levels of the respective guiding reference points.

Exemplary Embodiment 21

Further, in the eye-flow guiding level calculating method of the exemplary embodiment 21 according to the exemplary embodiment 19 or 20 of the invention, in the guiding reference point detecting, based on the image data, a vertex of a projection or its vicinity in the image is detected as the guiding reference point.

According to this construction, the same advantages as those in the eye-flow guiding level calculating system of the exemplary embodiment 3 can be obtained.

Exemplary Embodiment 22

Further, in the eye-flow guiding level calculating method of the exemplary embodiment 22 according to any one of the exemplary embodiments 19 to 21 of the invention, the eye-flow guiding level calculating includes calculating an eye-flow guiding direction, which is a direction of guiding the eye-flow, with respect to the guiding reference point detected in the guiding reference point detecting, and calculating an eye-flow guiding intensity, which is the intensity of guiding the eye-flow, with respect to the guiding reference point detected in the guiding reference point detecting.

According to this construction, the same advantages as those in the eye-flow guiding level calculating system of the exemplary embodiment 4 can be obtained.

Exemplary Embodiment 23

Further, in the eye-flow guiding level calculating method of the exemplary embodiment 23 according to the exemplary embodiment 22 of the invention, in the eye-flow guiding direction calculating, on the assumption that two auxiliary lines are formed to intersect the guiding reference point or its vicinity along an edge of the image passing through the guiding reference point or its vicinity, the eye-flow guiding direction is calculated based on the central direction of an obtuse angle among angles which the virtual auxiliary lines make.

According to this construction, the same advantages as those in the eye-flow guiding level calculating system of the exemplary embodiment 5 can be obtained.

Exemplary Embodiment 24

Further, in the eye-flow guiding level calculating method of the exemplary embodiment 24 according to the exemplary embodiment 22 or 23 of the invention, in the eye-flow guiding intensity calculating, the eye-flow guiding intensity is calculated based on a distance, up to the guiding reference point, from the center of an image object, of which the outline is formed to include the edge of the image passing through the guiding reference point or its vicinity.

According to this construction, the same advantages as those in the eye-flow guiding level calculating system of the exemplary embodiment 6 can be obtained.

Exemplary Embodiment 25

Further, in the eye-flow guiding level calculating method of the exemplary embodiment 25 according to any one of the exemplary aspects 22 to 24 of the invention, in the eye-flow guiding intensity calculating, in an image object which is formed to include a vertex of an image serving as the guiding reference point or a vertex of an image in the vicinity of the guiding reference point, on the assumption that an auxiliary line is formed to pass through a vertex other than the vertex serving as the guiding reference point or other than the vertex in the vicinity of the guiding reference point, the eye-flow guiding intensity is calculated based on a distance from one point on the virtual auxiliary line up to the guiding reference point.

According to this construction, the same advantages as those in the eye-flow guiding level calculating system of the exemplary embodiment 7 can be obtained.

Exemplary Embodiment 26

Further, in the eye-flow guiding level calculating method of the exemplary embodiment 26 according to any one of the exemplary embodiments 22 to 24 of the invention, in the eye-flow guiding intensity calculating, on the assumption that two auxiliary lines are formed to intersect the guiding reference point or its vicinity along an edge of an image passing through the guiding reference point or its vicinity, the eye-flow guiding intensity is calculated based on a distance, up to the guiding reference point, from a point at which a bisector line of an acute angle among angles which the virtual auxiliary lines make, intersects an outer line of an image object whose outline is formed to include the edge.

According to this construction, the same advantages as those in the eye-flow guiding level calculating system of the exemplary embodiment 8 can be obtained.

Exemplary Embodiment 27

In the eye-flow guiding level calculating method of the exemplary embodiment 27 according to any one of the exemplary embodiments 22 to 24 and 26 of the invention, in the eye-flow guiding intensity calculating, on the assumption that two auxiliary lines are formed to intersect the guiding reference point or its vicinity along the edge of an image passing through the guiding reference point or its vicinity, the eye-flow guiding intensity is calculated based on angles which the virtual auxiliary lines make.

According to this construction, the same advantages as those in the eye-flow guiding level calculating system of the exemplary embodiment 9 can be obtained.

BRIEF DESCRIPTION OF THE DRAWINGS

FIG. 5 is a diagram in which a vector image is arranged on a two-dimensional coordinate space;

FIG. 6 is a diagram showing an example of calculation to obtain a guiding reference point;

FIG. 8 is a diagram showing vector composition to obtain an eye-flow guiding direction a;

FIG. 24 is a diagram showing a case in which the direction of a divided region in a vertical direction edge is detected;

FIG. 29 is a flow chart showing an eye-flow guiding level calculation processing;

FIG. 30 is a diagram showing a case in which vector composition is performed on the eye-flow guiding directions and eye-flow guiding intensities of the respective guiding reference points;

DETAILED DESCRIPTION OF PREFERRED EMBODIMENTS

Hereinafter, a first exemplary embodiment of the present invention will be described with reference to the drawings. FIGS. 1 to 15 are diagrams showing the first exemplary embodiment of an eye-flow guiding level calculating system, an eye-flow guiding level calculating program, and an eye-flow guiding level calculating method according to exemplary embodiments of the present invention.

The present exemplary embodiment relates to the application of the eye-flow guiding level calculating system, the eye-flow guiding level calculating program, and the eye-flow guiding level calculating method according to exemplary embodiments of the present invention to a case in which the direction and intensity of guiding the eye-flow of an image object are calculated.

First, the configuration of a layout device 100 to which exemplary embodiments of the present invention are applied will be described with reference to FIG. 1.

Figure 1:
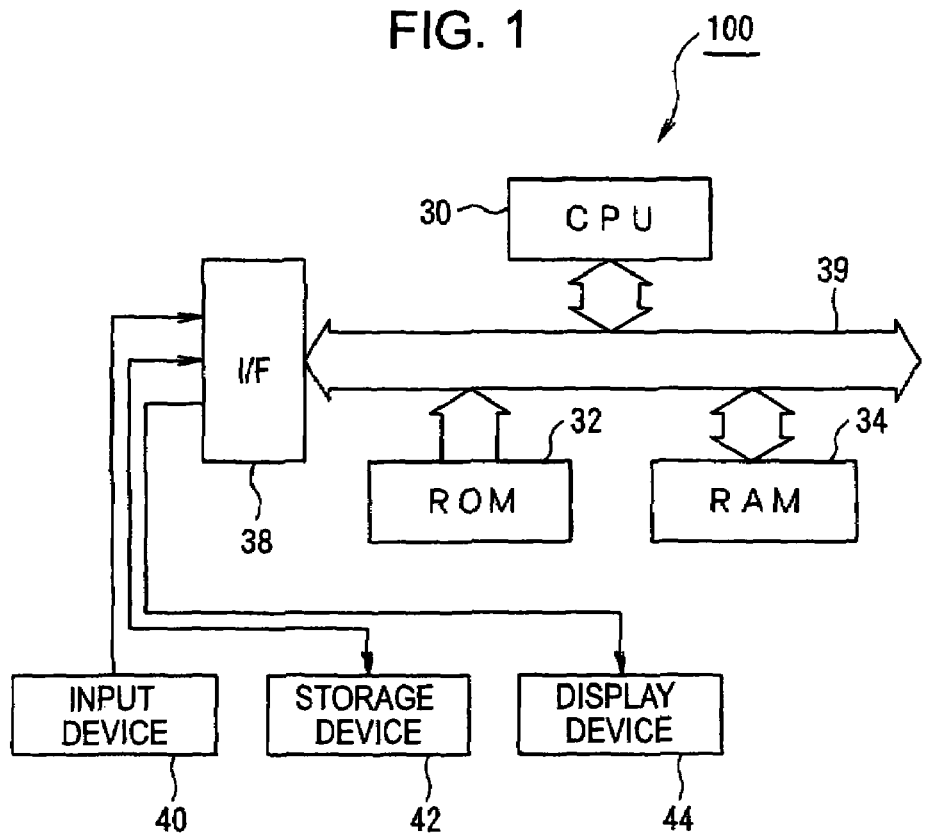
FIG. 1 is a schematic block diagram showing a construction of a layout device 100.

FIG. 1 is a block diagram showing the construction of the layout device 100.

As shown in FIG. 1, the layout device 100 includes a CPU 30 to control arithmetic and an overall system based on a control program, a ROM 32 to previously store the control program of the CPU 30 and so on in a predetermined region, a RAM 34 to store data read from the ROM 32 or the like and arithmetic results required for an arithmetic process of the CPU 30, and an I/F 38 to mediate the input and output of data to external devices. These elements are communicatably connected to each other through a bus 39 serving as a signal line.

An input device 40 including a keyboard or a mouse which can input data as a human interface, a storage device 42 to store data or tables as a file, and a display device 44 to display an image based on an image signal are connected to the I/F 38 as the external devices.

The CPU 30 is comprised of a micro processing unit (MPU) and the like and starts a predetermined program stored in a predetermined region of the ROM 32. And then, according to the program, an eye-flow guiding level calculation processing shown in a flow chart of FIG. 2 is performed.

Figure 2:
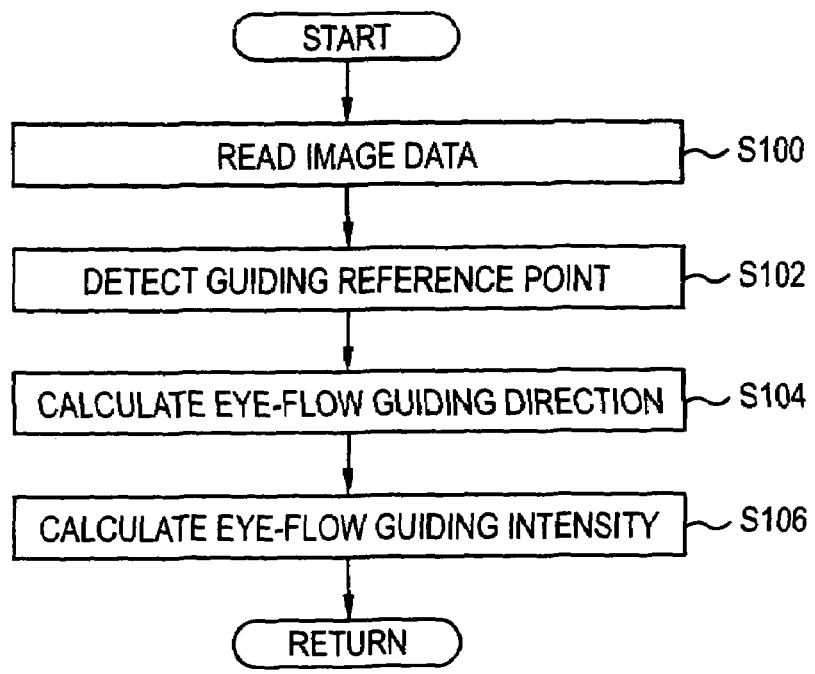
FIG. 2 is a flow chart showing an eye-flow guiding level calculation processing.

FIG. 2 is a flow chart showing the eye-flow guiding level calculation processing.

The eye-flow guiding level calculation processing is a processing in which the direction and intensity of guiding the eye-flow of an image object are calculated. As shown in FIG. 2, if it is executed in the CPU 30, first, the process progresses to step S100.

In the step S100, image data is read from the storage device 42, and then the process progresses to step S102. In the step S102, based on the read image data, a guiding reference point serving as a reference which guides the eye-flow from the image object is detected, and then the process progresses to step S104.

In the step S104, an eye-flow guiding direction which represents a direction of guiding the eye-flow is calculated with respect to the detected guiding reference point, and then the process progresses to step S106. In the step S106, an eye-flow guiding intensity which represents the intensity of guiding the eye-flow is calculated with respect to the detected guiding reference point. In such a manner, after a series of processes are completed, the process returns to the initial step.

Next, an image data input processing of the step S100 will be described in detail with reference to FIGS. 3 to 5.

Figures 3, 4:
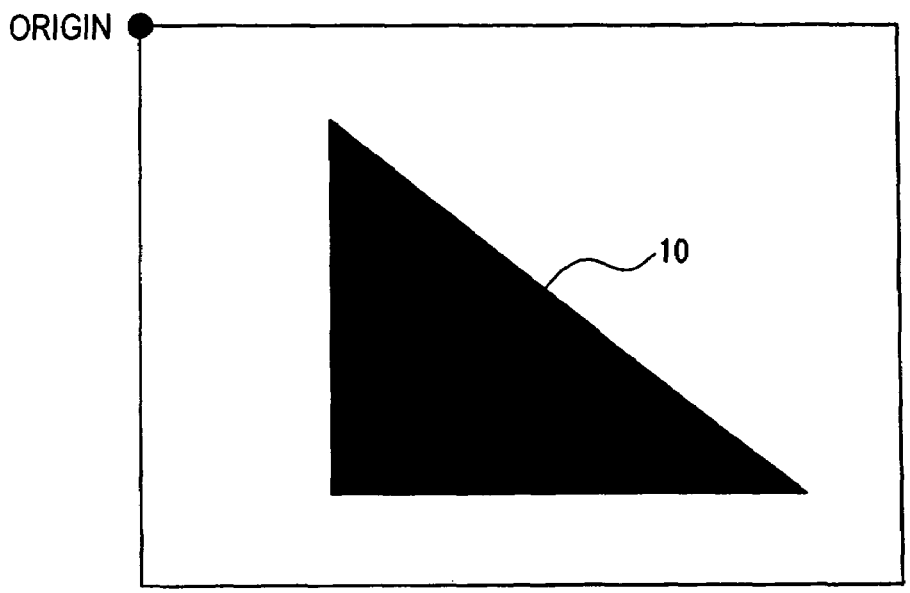
FIG. 3 is a diagram showing a vector image having an image object 10.
FIG. 4 is a diagram showing a data structure of vector image data.

FIG. 3 is a diagram showing a vector image having an image object 10.

As shown in FIG. 3, in the step S100, image data of the vector image having the image object 10 is read from the storage device 42. In the example of FIG. 3, the image object 10 is a right-angled triangle.

FIG. 4 is a diagram showing a data structure of vector image data.

As shown in FIG. 4, vector image data has a data structure in which the shape or size of the image object 10 is represented by numeric values. The vector image data may be constructed in a representative data format, such as SVG. In the example of FIG. 4, the coordinates of the respective vertexes of the image object 10 are designated in a tag (<polygon points>) showing that a polygon is drawn. This shows that the image object 10 is formed by drawing a line between adjacent designated coordinates.

FIG. 5 is a diagram in which a vector image is arranged on a two-dimensional coordinate space.

As shown in FIG. 5, the vector image may be arranged on the two-dimensional coordinate space. In the example of FIG. 5, the vector image is arranged on the two-dimensional coordinate space with an upper left side of the vector image as an origin.

Next, a guiding reference point detection processing of the step S102 will be described in detail with reference to FIG. 6.

In the step S102, based on the read vector image data, the respective vertexes A to C of the image object 10 are detected as the guiding reference points. As shown in FIG. 4, in the case in which the coordinates of the respective vertexes A to C are included in vector image data, by acquiring the coordinates of the respective vertexes A to C from the vector image data, it is possible to detect the guiding reference points.

Moreover, in the case in which the coordinates of the respective vertexes A to C are not included in vector image data, by solving the equation of an outer line of the image object 10, it is possible to obtain the guiding reference points.

FIG. 6 is a diagram showing an example of calculation to obtain a guiding reference point.

In the example of FIG. 6, the equation of a line connecting the vertexes A and B (hereinafter, referred to as a line AB)

among the outer line of the image object 10 is represented by $X=2 (1 \leq Y \leq 5)$, and the equation of a line connecting the vertexes B and C (hereinafter, referred to as a line BC) among the outer line of the image object 10 is represented by $Y=5$ ($2 \leq X \leq 7$). Further, the equation of a line connecting the vertexes C and A (hereinafter, referred to as a line CA) among the outer line of the image object 10 is represented by $Y=2X-3 (2 \leq X \leq 7)$. Thus, the coordinates of the respective vertexes A to C can be calculated by solving the equations of the lines. As a result, the coordinates of the respective vertexes A to C can be calculated as A(2, 1), B(2, 5), and C(5, 7), respectively.

Next, an eye-flow guiding direction calculation processing of the step S104 will be described in detail with reference to FIGS. 7 to 10.

In the step S104, for every guiding reference point, two auxiliary lines are virtually formed to intersect the guiding reference point, and the direction in which a bisector line of an obtuse angle among angles which the virtual auxiliary lines make, extends outward from the guiding reference point and is calculated as an eye-flow guiding direction.

Figure 7:
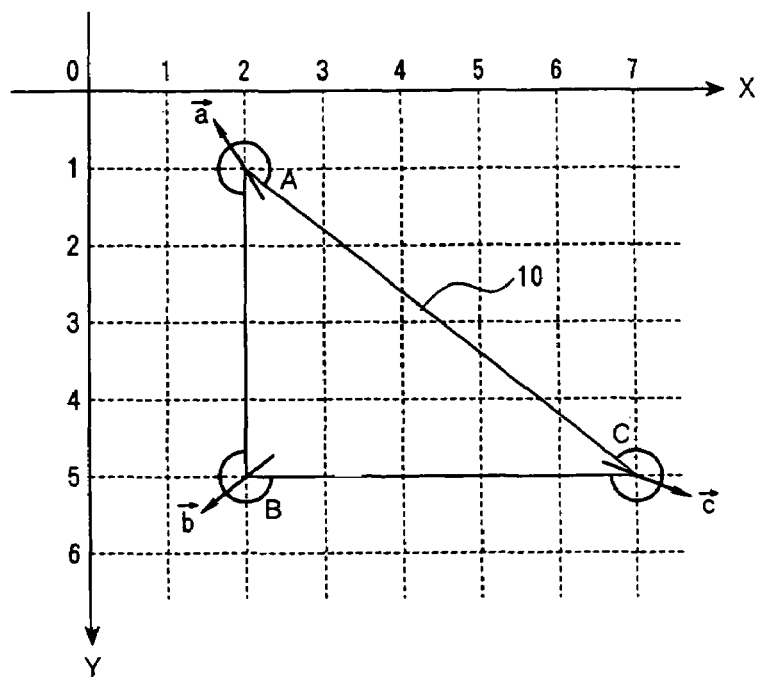
FIG. 7 is a diagram showing an eye-flow guiding direction at a guiding reference point.

FIG. 7 is a diagram showing an eye-flow guiding direction at a guiding reference point.

As shown in FIG. 7, when the eye-flow guiding directions at the guiding reference points A to C are a to c, respectively, the virtual auxiliary lines of the guiding reference point A are the line AB and the line CA, the virtual auxiliary lines of the guiding reference point B are the line AB and the line BC, and the virtual auxiliary lines of the guiding reference point C are the line CA and the line BC, the eye-flow guiding directions a to c can be calculated as $(-2.5, -4)$, $(-2.5, 2)$, and $(5, 2)$ by the following equations (1) to (3), respectively.

[Equation 1]

$$\vec{a} = \frac{\overrightarrow{BA} + \overrightarrow{CA}}{2} \qquad (1)$$
$$= \frac{(0, -4) + (-5, -4)}{2}$$
$$= \frac{(-5, -8)}{2} = (-2.5, -4)$$

[Equation 2]

$$\vec{b} = \frac{\overrightarrow{AB} + \overrightarrow{CB}}{2} \qquad (2)$$
$$= \frac{(0, 4) + (-5, 0)}{2}$$
$$= \frac{(-5, 4)}{2} = (-2.5, 2)$$

[Equation 3]

$$\vec{c} = \frac{\overrightarrow{AC} + \overrightarrow{BC}}{2} \qquad (3)$$
$$= \frac{(5, 4) + (5, 0)}{2}$$
$$= \frac{(10, 4)}{2} = (5, 2)$$

In addition, if the coordinates are normalized in a vector of a size '1', the eye-flow guiding directions a to c can be calculated as $(-0.53, -0.85)$, $(-0.78, 0.62)$, and $(0.93, 0.37)$ by the following equations (4) to (6), respectively.

[Equation 4]

$$\frac{\vec{a}}{|\vec{a}|} = \left( \frac{-2.5}{\sqrt{22.25}}, \frac{-4}{\sqrt{22.25}} \right) \approx (-0.53, -0.85) \qquad (4)$$

[Equation 5]

$$\frac{\vec{b}}{|\vec{b}|} = \left( \frac{-2.5}{\sqrt{10.25}}, \frac{2}{\sqrt{10.25}} \right) \approx (-0.78, -0.62) \qquad (5)$$

[Equation 6]

$$\frac{\vec{c}}{|\vec{c}|} = \left( \frac{5}{\sqrt{29}}, \frac{2}{\sqrt{29}} \right) \approx (0.93, 0.37) \qquad (6)$$

Figure 8:
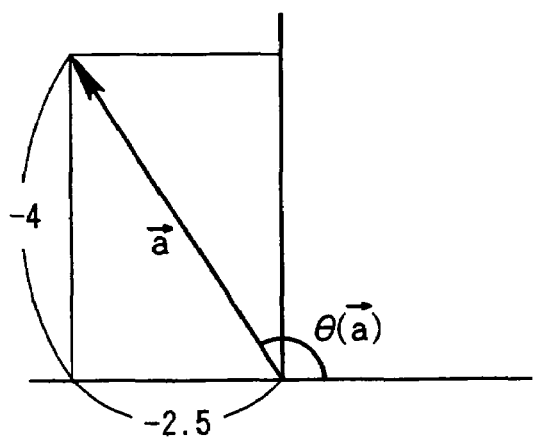

FIG. 8 is a diagram showing vector composition to obtain the eye-flow guiding direction a.

Further, when the direction of three o'clock is set to 0°, an angle of the eye-flow guiding direction, in particular, the eye-flow guiding direction a, can be calculated as '122°' by the following equation (7), as described in FIG. 8.

[Equation 7]

$$\vec{a} \text{ direction (radian)} = \frac{\pi}{2} + \arctan\left(\frac{-2.5}{-4}\right) \approx 2.13 \qquad (7)$$

$$\vec{a} \text{ direction (degree)} = 122$$

Figure 9:
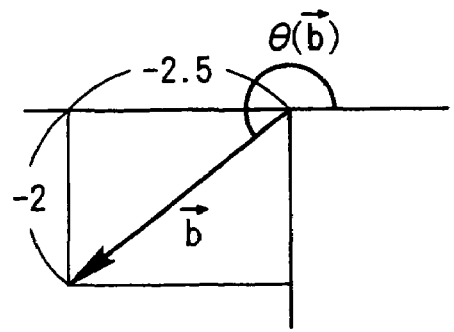
FIG. 9 is a diagram showing vector composition to obtain an eye-flow guiding direction b.

FIG. 9 is a diagram showing vector composition to obtain the eye-flow guiding direction b.

Similarly, an angle of the eye-flow guiding direction b can be calculated as '219°' by the following equation (8), as shown in FIG. 9.

[Equation 8]

$$\vec{b} \text{ direction (radian)} = \pi + \arctan\left(\frac{-2}{-2.5}\right) \approx 3.82 \qquad (8)$$

$$\vec{b} \text{ direction (degree)} = 338$$

Figure 10:
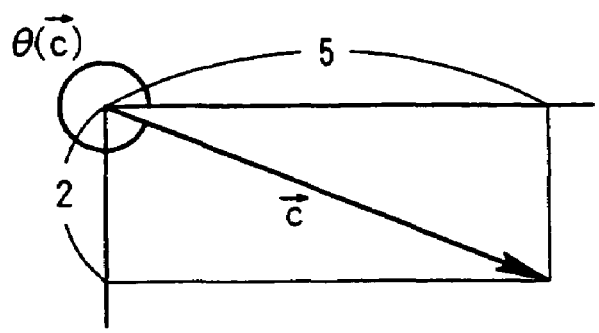
FIG. 10 is a diagram showing vector composition to obtain an eye-flow guiding direction c.

FIG. 10 is a diagram showing vector composition to obtain the eye-flow guiding direction c.

Similarly, an angle of the eye-flow guiding direction c can be calculated as '338°' by the following equation (9), as shown in FIG. 10.

[Equation 9]

$$\vec{c} \text{ direction (radian)} = \frac{3}{2}\pi + \arctan\left(\frac{5}{2}\right) \approx 5.90 \qquad (9)$$

$$\vec{c} \text{ direction (degree)} = 338$$

Next, an eye-flow guiding intensity calculation processing of the step S106 will be described in detail with reference to FIG. 11.

In the step S106, for every guiding reference point, a distance from the center G of the image object 10 up to the guiding reference point (hereinafter, referred to as a central distance) is calculated as the eye-flow guiding intensity.

Figure 11:
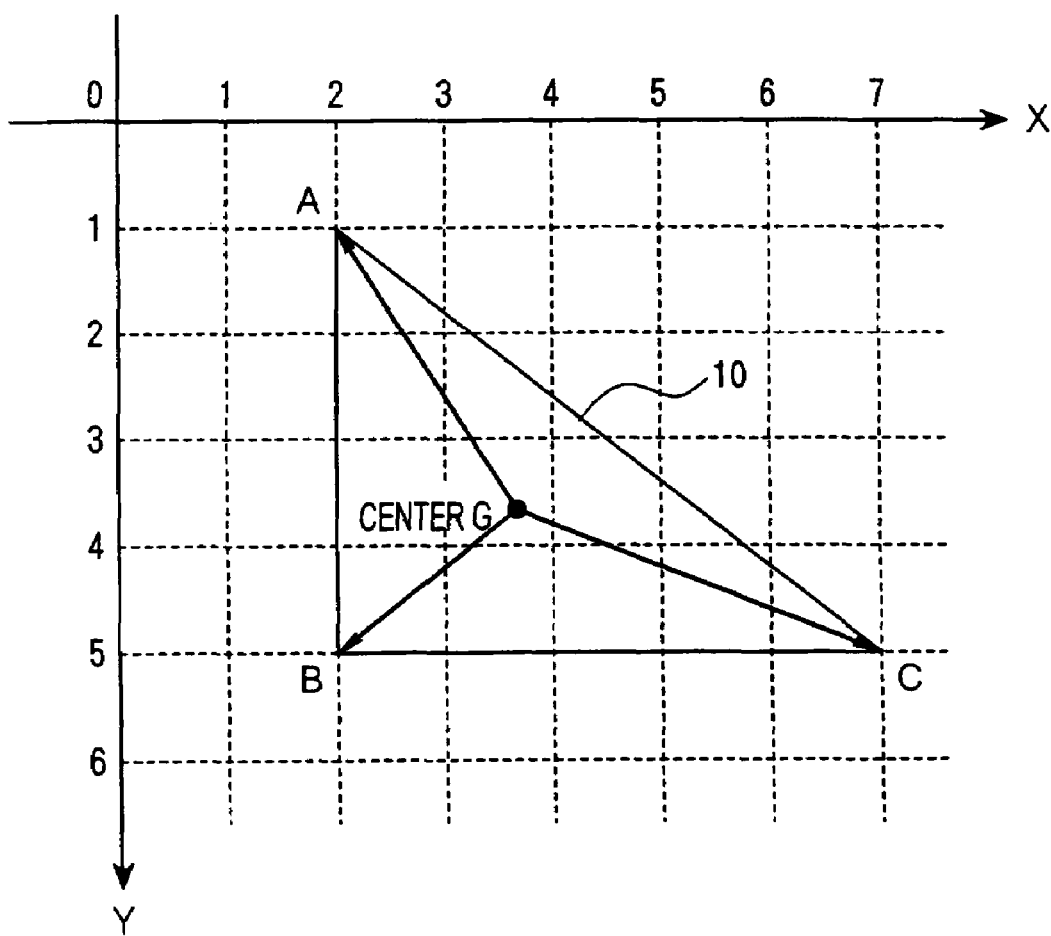
FIG. 11 is a diagram showing a central distance from a guiding reference point.

FIG. 11 is a diagram showing a central distance from a guiding reference point.

The coordinate of the center G of the image object 10 can be calculated as (3.67, 3.67) by the following equation (10), as shown in FIG. 11.

[Equation 10]

$$\vec{OG} = \frac{\vec{OA} + \vec{OB} + \vec{OC}}{3} \quad (10)$$
$$= \left(\frac{11}{3}, \frac{11}{3}\right)$$
$$\approx (3.67, 3.67)$$

Therefore, the central distances from the respective vertexes A to C can be calculated as '3.14', '2.13', and '3.59' by the following equations (11) to (13), respectively.

[Equation 11]

$$|\vec{GA}| = |\vec{OA} - \vec{OG}| \quad (11)$$
$$= \sqrt{\left(2 - \frac{11}{3}\right)^2 - \left(1 - \frac{11}{3}\right)^2}$$
$$\approx 3.14$$

[Equation 12]

$$|\vec{GB}| = |\vec{OB} - \vec{OG}| \quad (12)$$
$$= \sqrt{\left(2 - \frac{11}{3}\right)^2 - \left(5 - \frac{11}{3}\right)^2}$$
$$\approx 2.13$$

[Equation 13]

$$|\vec{GC}| = |\vec{OC} - \vec{OG}| \quad (13)$$
$$= \sqrt{\left(7 - \frac{11}{3}\right)^2 - \left(5 - \frac{11}{3}\right)^2}$$
$$\approx 3.59$$

Figures 12, 13:
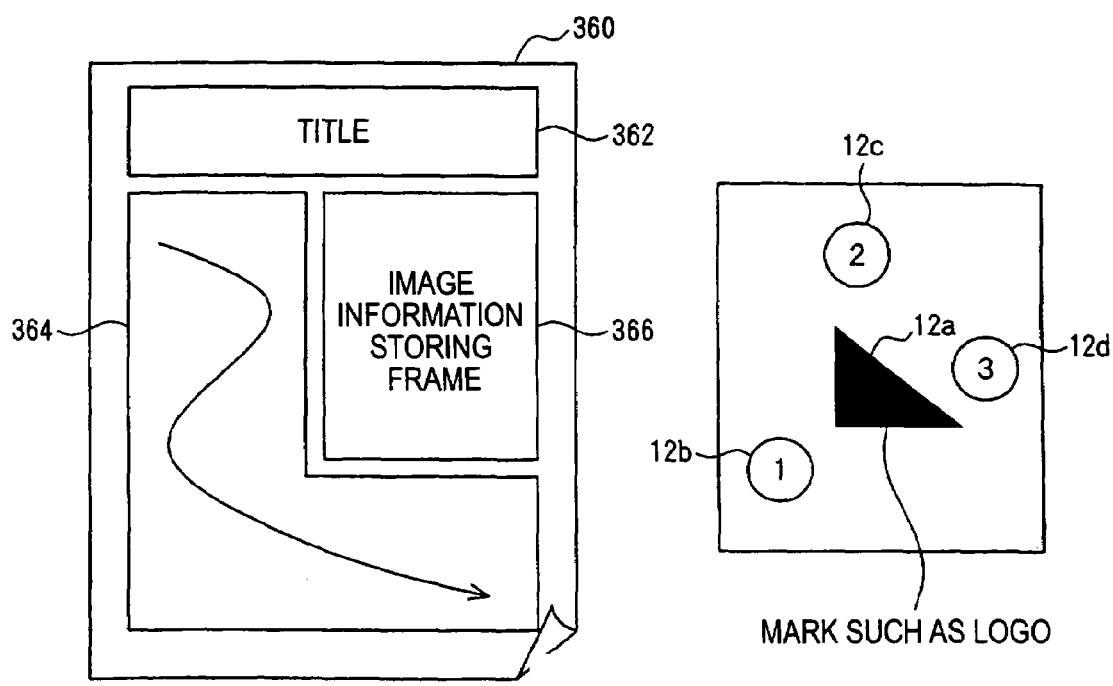
FIG. 12 is a table showing eye-flow guiding directions and eye-flow guiding intensities at the respective guiding reference points.
FIG. 13 is a schematic diagram showing a case in which a page is laid out using a layout template.

FIG. 12 is a table showing the eye-flow guiding directions and eye-flow guiding intensities of the respective guiding reference points.

Accordingly, as shown in FIG. 12, the eye-flow guiding direction and the eye-flow guiding intensity at the guiding reference point A can be calculated as (−0.53, −0.85) and '3.14'. This shows that the eye-flow is guided in the direction of (−0.53, −0.85) and the size of '3.14' with the vertex A of the image object 10 as a reference.

The eye-flow guiding direction and the eye-flow guiding intensity at the guiding reference point B can be calculated as (−0.78, 0.62) and '2.13'. This shows that the eye-flow is guided in the direction of (−0.78, 0.62) and the size of '2.13' with the vertex B of the image object 10 as a reference.

The eye-flow guiding direction and the eye-flow guiding intensity at the guiding reference point C can be calculated as (0.93, 0.37) and '3.59'. This shows that the eye-flow is guided in the direction of (0.93, 0.37) and the size of '3.59' with the vertex C of the image object 10 as a reference.

Next, the operation of the present exemplary embodiment will be described.

In the layout device 100, with going through the steps S100 and S102, vector image data is read, and based on the read vector image data, the respective vertexes of the image object 10 are detected as the guiding reference points.

And then, with going through the step S104, for every guiding reference point, two auxiliary lines are formed to intersect the guiding reference point along the outline of the image object 10, and the direction in which a bisector line of an obtuse angle among the auxiliary lines make extends outward from the guiding reference point is calculated as the eye-flow guiding direction. Further, with going through the step S106, for every guiding reference point, the central distance is calculated as the eye-flow guiding intensity.

In such a manner, if the eye-flow guiding directions and the eye-flow guiding intensities with respect to the image object 10 are calculated, it is possible to quantitatively grasp in which direction the image object 10 tends to guide the eye-flow, based on the eye-flow guiding directions and the eye-flow guiding intensities.

The eye-flow guiding directions and the eye-flow guiding intensities can be applied to the layout.

FIG. 13 is a diagram showing a case in which a page is laid out using a layout template.

As shown in FIG. 13, in the case in which the page is laid out using the layout template in which a title information storing frame 362 to store title information, a character information storing frame 364 to store character information, and an image information storing frame 366 are arranged in a layout region 360, it can be considered that title information of an article is stored in the title information storing frame 362, and that character information of the article is stored in the character information storing frame 364. Further, as shown at the right side of FIG. 13, image objects 12a to 12d may be stored in the image information storing frame 366. The image object 12a is a mark, such as a logo, for example. Further, the image objects 12b to 12d are appeal points of operation regions or the like, for example, and the numbers in the objects represent the order of priority for appeal.

Figure 14:
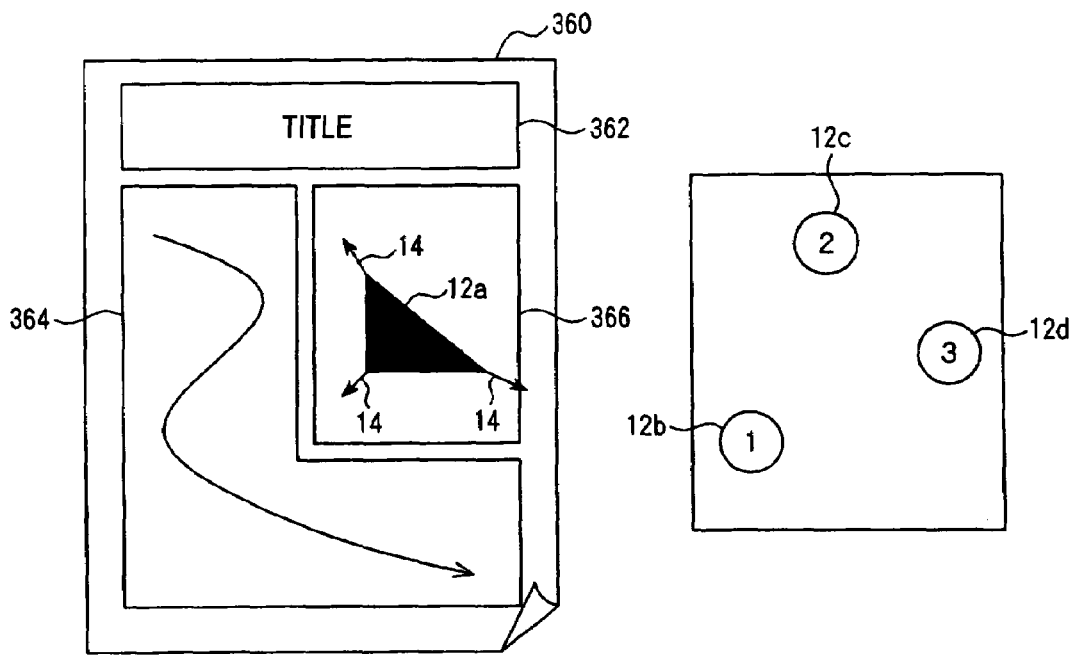
FIG. 14 is a schematic diagram showing a case in which eye-flow guiding notifying information 14 is displayed.

FIG. 14 is a diagram showing a case in which eye-flow guiding notifying information is displayed.

In many cases, an editor strays how he arranges the image objects 12b to 12d with respect to the image object 12a. Therefore, as shown in FIG. 14, eye-flow guiding notifying information 14 is displayed so as to correspond to the respective guiding reference points of the image object 12a, and the editor is notified of the eye flow of the image object 12a.

Figure 15:
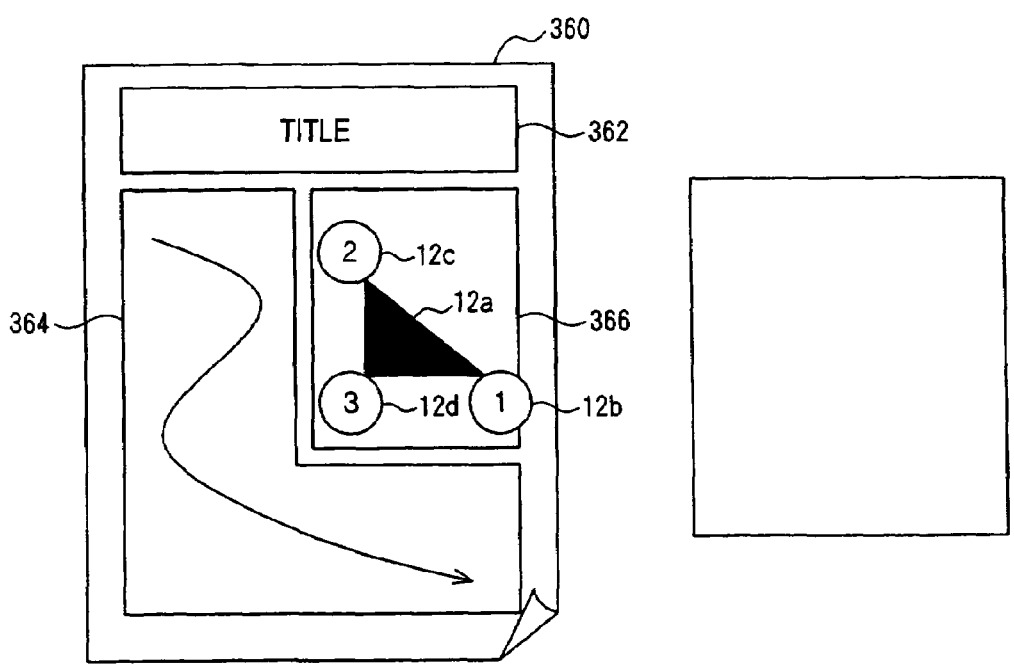
FIG. 15 is a schematic diagram showing a case in which image objects 12*a* to 12*d* are arranged with reference to the eye-flow guiding notifying information 14.

FIG. 15 is a diagram showing a case in which the image objects 12a to 12d are arranged with reference to the eye-flow guiding notifying information 14.

The editor can arrange the image object 12b at a position having the largest eye-flow guiding intensity along the eye-flow guiding direction, as shown in FIG. 15, with reference to the eye-flow guiding notifying information 14. At the same time, he can arrange the image objects 12c and 12d at positions having the secondary and the third large eye-flow guiding intensities along the eye-flow guiding direction, respectively. In such a manner, if the image objects 12b to 12d are arranged, when a reader views the image object 12a, the eye-flow tends to flow in the order of the image objects 12b to 12d. Thus, an advantage of the appeal of the priority which the editor expects, is obtained.

In such a manner, in the present exemplary embodiment, the guiding reference point is detected from the image object 10 based on vector image data, and the eye-flow guiding direction and the eye-flow guiding intensity are calculated with respect to the detected guiding reference point.

Accordingly, it is possible to calculate quantitatively and relatively suitably in which direction the image object 10 tends to guide the eye-flow. Thus, it is possible to obtain quantitatively the relatively suitable eye flow as compared with the related art. Further, since it is not necessary to provide an additional apparatus, such as a camera, the device does not have a large scale and high cost is not required. Thus, it is possible to plan the miniaturization and low cost of the device, as compared with the related art. In addition, since a method, such as learning, is not used to calculate the eye-flow guiding level, it is possible to obtain relatively surely, the suitable eye flow.

In addition, in the present exemplary embodiment, the vertex of the image object 10 is detected as the guiding reference point based on vector image data.

The eye-flow tends to be guided from the inside of the image object 10 toward the vertex. Therefore, by detecting the vertex of the image object 10 as the guiding reference point, it is possible to calculate further suitably in which direction the image object 10 tends to guide the eye-flow.

In addition, in the present exemplary embodiment, the two auxiliary lines are virtually formed to intersect the guiding reference point along the outline of the image object 10, and the direction in which the bisector line of the obtuse angle among the angles which the virtual auxiliary lines make extends to outward from the guiding reference point is calculated as the eye-flow guiding direction.

Accordingly, it is possible to calculate the direction from the inside of the image object 10 toward the vertex as the eye-flow guiding direction. Thus, it is possible to calculate further suitably in which direction the image object 10 tends to guide the eye-flow.

In addition, in the present exemplary embodiment, the central distance from the guiding reference point is calculated as the eye-flow guiding intensity.

The more an angle of the vertex of the image object 10 is sharpened, the more the eye-flow tends to be guided. Further, the more the angle of the vertex is sharpened, the larger the central distance is. Therefore, it is possible to calculate the eye-flow guiding intensity depending on the angle of the vertex of the image object 10. Thus, it is possible to calculate further suitably in which direction the image object 10 tends to guide the eye-flow.

In the first exemplary embodiment, the step S102 corresponds to the guiding reference point detecting device of the exemplary embodiment 1 or 4, or the guiding reference point detecting of the exemplary embodiment 10, 13, 19, or 22, and the steps S104 and S106 correspond to the eye-flow guiding level calculating device of the exemplary embodiment 1 or 4, or the eye-flow guiding level calculating of the exemplary embodiment 10, 13, 19, or 22. Further, the step S104 corresponds to the eye-flow guiding direction calculating device of the exemplary embodiment 4 or 5, or the eye-flow guiding direction calculating of the exemplary embodiment 13, 14, 22, or 24, and the S106 corresponds to the eye-flow guiding intensity calculating of the exemplary embodiment 12, 17, 22, or 26.

Second Exemplary Embodiment

Next, a second exemplary embodiment of the present invention will be described with reference to the drawings. FIGS. 16 to 19 are diagrams showing the second exemplary embodiment of the eye-flow guiding level calculating system, the eye-flow guiding level calculating program, and the eye-flow guiding level calculation method according to exemplary embodiments of the present invention.

The present exemplary embodiment relates to the application of the eye-flow guiding level calculating system, the eye-flow guiding level calculating program, and the eye-flow guiding level calculating method according to embodiments of the present invention to a case in which the direction and intensity of guiding the eye-flow of the image object 10 are calculated. The present exemplary embodiment is different from the first exemplary embodiment in that the distance from a sideline opposite to the guiding reference point among the outer line of the image object 10 (hereinafter, referred to as an opposite sideline) up to the guiding reference point is calculated as the eye-flow guiding intensity. Hereinafter, only different portions from those of the first exemplary embodiment will be described. Further, the same elements as those of the first exemplary embodiment are represented by the same reference numerals, and the descriptions thereof will be omitted.

An eye-flow guiding intensity calculation processing of the step S106 will be described in detail with reference to FIGS. 16 to 19.

In the step S106, for every guiding reference point, an auxiliary line is virtually formed to pass through the guiding reference point in the eye-flow guiding direction, and a distance (hereinafter, referred to as a bosom distance) from a point, at which the virtual auxiliary line intersects an opposite sideline, up to the guiding reference point is calculated as the eye-flow guiding intensity.

Figures 16, 17:
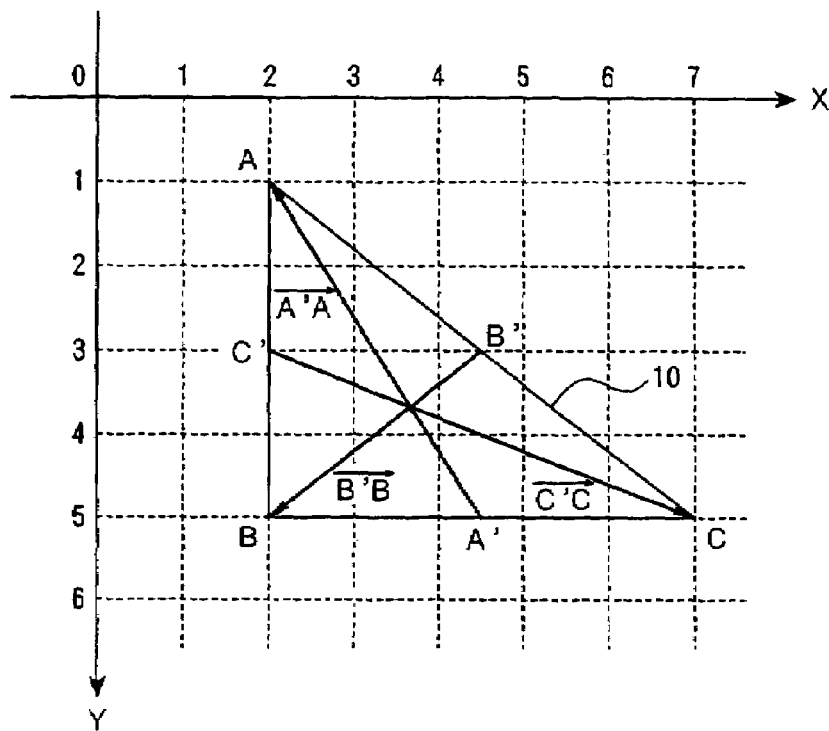
FIG. 16 is a diagram showing a bosom distance from a guiding reference point.
FIG. 17 is a table showing an example of calculation to obtain coordinates at which a virtual auxiliary line intersects an opposite sideline.

FIG. 16 is a diagram showing the bosom distance from the guiding reference point.

FIG. 17 is a table showing an example of calculation to obtain the coordinates of the point at which the virtual auxiliary line intersects the opposite sideline.

In order to obtain the bosom distance, first, the coordinate of the point at which the virtual auxiliary line intersects the opposite sideline is obtained. As regards the guiding reference point A, as shown in FIGS. 16 and 17, the equation of the virtual auxiliary line is represented by $y=1.6x-2.2$, and the equation of the opposite sideline is represented by $y=5$. Thus, the coordinate of an intersection A' of the two lines can be calculated by solving the equations of the respective lines. As a result, the coordinate of the intersection A' can be calculated as (4.5, 5).

With regards to the guiding reference point B, the equation of the virtual auxiliary line is represented by $y=-0.8x+6.6$, and the equation of the opposite sideline is represented by $y=0.8x-0.6$. Thus, by solving the equations of the respective lines, the coordinate of an intersection B' of the two lines can be calculated can be calculated as (4.5, 3).

With regards to the guiding reference point C, the equation of the virtual auxiliary line is represented by $y=0.4x+2.2$, and the equation of the opposite sideline is represented by $x=2$. Thus, by solving the equations of the respective lines, the coordinate of an intersection C' of the two lines can be calculated as (2, 3).

Figures 18, 19, 20:
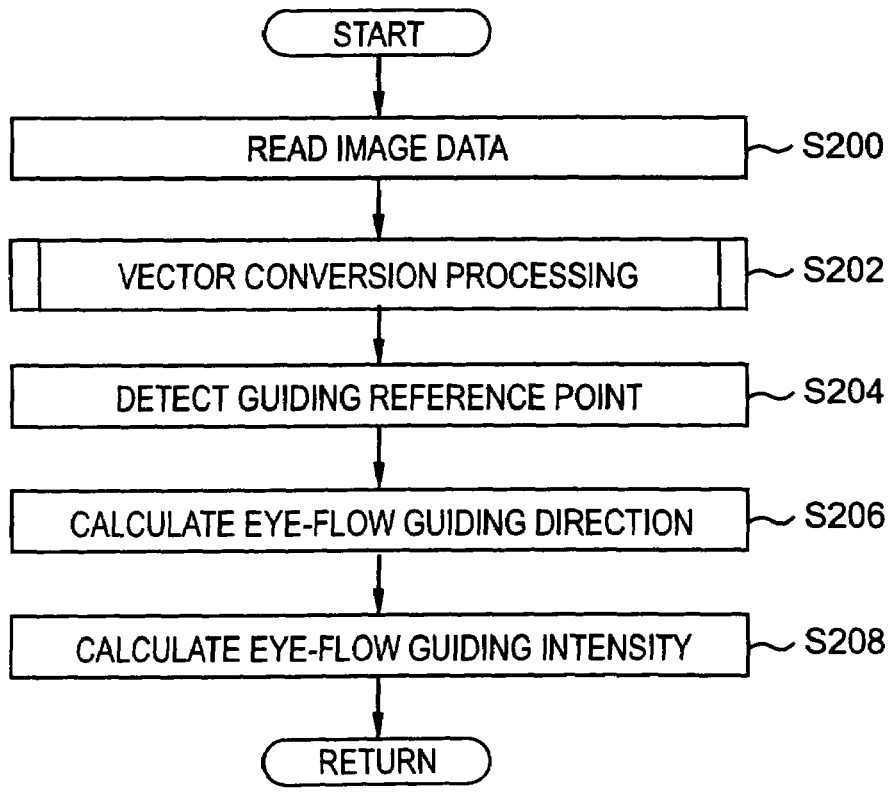
FIG. 18 is a table showing an example of calculation to obtain a bosom distance.
FIG. 19 is a table showing the eye-flow guiding directions and eye-flow guiding intensities at the respective guiding reference points.
FIG. 20 is a flow chart showing an eye-flow guiding level calculation processing.

FIG. 18 is a table showing an example of calculation to obtain the bosom distance.

Next, the bosom distances from the respective guiding reference points A to C are calculated based on the coordinates of the intersections A' to C'. Since the bosom distance from the guiding reference point A is a distance from the intersection A' up to the guiding reference point A, as shown in FIG. 18, it is calculated as '4.72'.

Since the bosom distance from the guiding reference point B is a distance from the intersection B' up to the guiding reference point B, it is calculated as '3.20'.

Since the bosom distance from the guiding reference point C is a distance from the intersection C' up to the guiding reference point C, it is calculated as '5.38'.

FIG. 19 is a table showing the eye-flow guiding directions and the eye-flow guiding intensities of the respective guiding reference points.

Accordingly, as shown in FIG. 19, the eye-flow guiding direction and the eye-flow guiding intensity at the guiding reference point A can be calculated as (−0.53, −0.85) and '4.72'. This shows that the eye-flow is guided in the direction of (−0.53, −0.85) and the size of '4.72' with the vertex A of the image object 10 as a reference.

The eye-flow guiding direction and the eye-flow guiding intensity at the guiding reference point B can be calculated as (−0.78, 0.62) and '3.20'. This shows that the eye-flow is guided in the direction of (−0.78, 0.62) and the size of '3.20' with the vertex B of the image object 10 as a reference.

The eye-flow guiding direction and the eye-flow guiding intensity at the guiding reference point C can be calculated as (0.93, 0.37) and '5.38'. This shows that the eye-flow is guided in the direction of (0.93, 0.37) and the size of '5.38' with the vertex C of the image object 10 as a reference.

Next, the operation of the present exemplary embodiment will be described.

In the layout device 100, with going through the steps S100 and S102, vector image data is read, and based on vector image data read, the respective vertexes of the image object 10 are detected as the guiding reference points.

And then, with going through the step S104, for every guiding reference point, two auxiliary lines are virtually formed to intersect the guiding reference point along the outline of the image object 10, and the direction in which the bisector line of the obtuse angle among the angles which the virtual auxiliary lines make extends outward from the guiding reference point is calculated the eye-flow guiding direction. Further, with going through the step S106, for every guiding reference point, the bosom distance is calculated as the eye-flow guiding intensity.

In such a manner, in the present exemplary embodiment, the bosom distance from the guiding reference point is calculated as the eye-flow guiding intensity.

The more an angle of the vertex of the image object 10 is sharpened, the more the eye-flow tends to be guided. Further, the more the angle of the vertex is sharpened, the larger the bosom distance is. Therefore, it is possible to calculate the eye-flow guiding intensity depending on the angle of the vertex of the image object 10. Thus, it is possible to calculate relatively suitably in which direction the image object 10 tends to guide the eye-flow.

In the second exemplary embodiment, the step S102 corresponds to the guiding reference point detecting device of the exemplary embodiment 1 or 4, or the guiding reference point detecting of the exemplary embodiment 10, 13, 19, or 22, and the steps S104 and S106 correspond to the eye-flow guiding level calculating device of the exemplary embodiment 1 or 4, or the eye-flow guiding level calculating of the exemplary embodiment 10, 13, 19, or 22. Further, the step S104 corresponds to the eye-flow guiding direction calculating device of the exemplary embodiment 4 or 5, or the eye-flow guiding direction calculating of the exemplary embodiment 13, 14, 22, or 23, and the step S106 corresponds to the eye-flow guiding intensity calculating device of the exemplary embodiment 5 or 8, or the eye-flow guiding intensity calculating of the exemplary embodiment 14, 17, 23, or 26.

Third Exemplary Embodiment

Next, a third exemplary embodiment of the present invention will be described with reference to the drawings. FIGS. 20 to 28 are diagrams showing the third exemplary embodiment of the eye-flow guiding level calculating system, the eye-flow guiding level calculating program, and the eye-flow guiding level calculation method according to exemplary embodiments of the present invention.

The present exemplary embodiment relates to the application of the eye-flow guiding level calculating system, the eye-flow guiding level calculating program, and the eye-flow guiding level calculating method according to exemplary embodiments of the present invention to a case in which the direction and intensity of guiding the eye-flow of the image object 10 are calculated. The present exemplary embodiment is different from the first and second exemplary embodiments in that the eye-flow guiding direction and the eye-flow guiding intensity are calculated from a raster image having the image object 10. Hereinafter, only different portions from those of the first and second exemplary embodiments will be described. Further, the same elements as those of the first and second exemplary embodiments are represented by the same reference numerals, and the descriptions thereof will be omitted.

The CPU 30 starts a predetermined program stored in a predetermined region of the RAM 32, and according to the program, instead of the eye-flow guiding level calculation processing shown in the flow chart of FIG. 2, an eye-flow guiding level calculation processing shown in a flow chart of FIG. 20 is preformed.

FIG. 20 is a flow chart showing an eye-flow guiding level calculation processing.

If the eye-flow guiding level calculation processing is performed by the CPU 30, first, the process progresses to step S200 as shown in FIG. 20.

In the step S200, raster image data is read from the storage device 42, and then the process progresses to step S202. In the step S202, vector conversion is performed on the read raster image data, and then the process progresses to step S204.

In the steps S204 to S208, the processes corresponding to the steps S102 to S106 in the flow chart of FIG. 2 are executed. Then, after a series of processes are completed, the process returns to the initial step.

Next, a vector conversion processing of the step S202 will be described in detail with reference to FIGS. 21 to 28.

Figure 21:
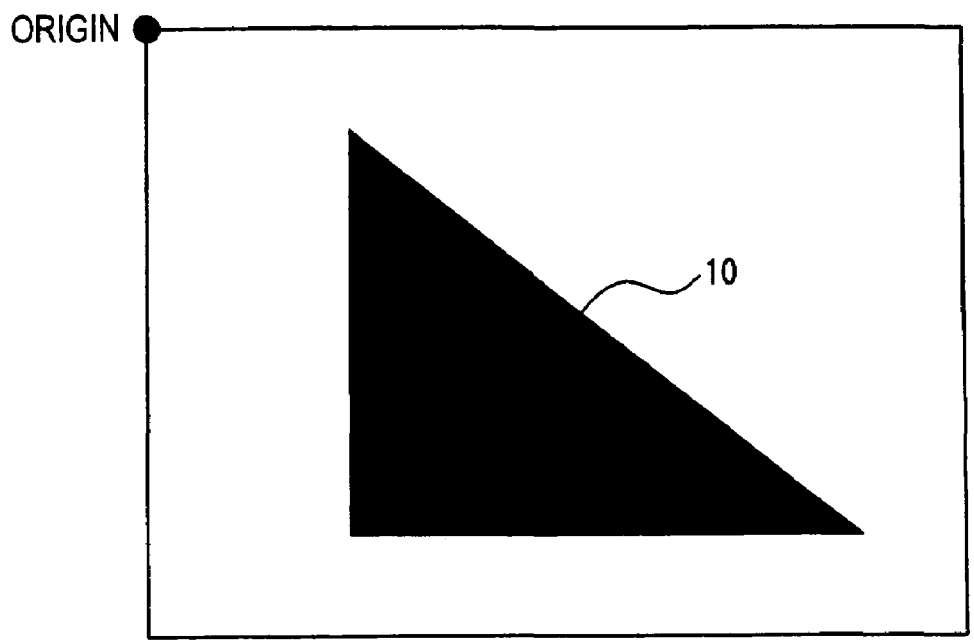
FIG. 21 is a diagram showing a raster image having the image object 10.

FIG. 21 is a diagram showing a raster image having the image object 10.

As shown in FIG. 21, in the step S202, the raster image is converted into a vector image based on the read raster image data. In the example of FIG. 21, the image object 10 has a right-angled triangle.

The vector conversion can be performed by means of a method in which, for example, a spatial filter called Pewitt is used.

Figure 22:
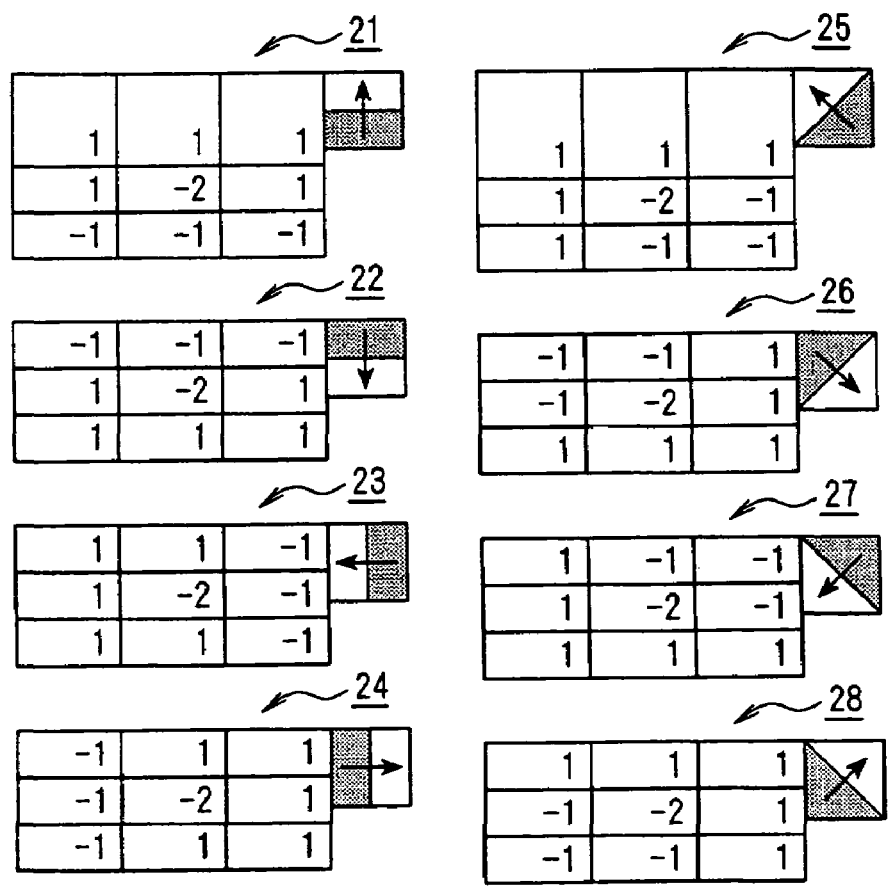
FIG. 22 is a diagram showing filter coefficients of a spatial filter.

FIG. 22 is a diagram showing filter coefficients of a spatial filter.

The spatial filter is intended to detect in which direction the edge of the raster image (accurately, the inclination of a shade) goes. As shown in FIG. 22, eight types of filters 21 to 28 to correspond to the directions of the image are prepared. The respective spatial filters 21 to 28 correspond to the eight directions, that is, an upper direction, a lower direction, a left direction, a right direction, an upper left direction, a lower right direction, a lower left direction, and an upper right direction, respectively.

Figure 23:
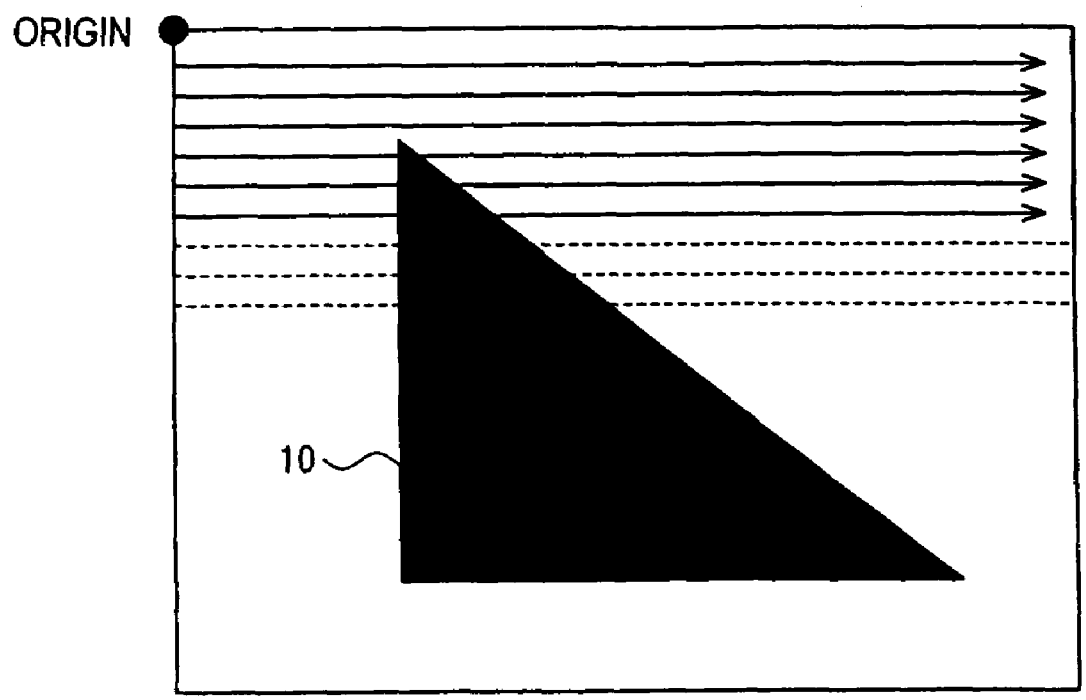
FIG. 23 is a diagram showing a case in which a raster image is scanned in the unit of nine pixels of 3×3.

FIG. 23 is a diagram showing a case in which the raster image is scanned in the unit of nine pixels of 3×3.

First, the entire region of the raster image is divided into the unit of nine pixels of 3×3. And then, as shown in FIG. 23, the raster image is scanned in the divided region unit with the upper left side of the raster image as an origin. With regards to the directions of the respective divided regions, matrix arithmetic is performed on pixel values of the respective divided regions by means of the eight types of the spatial filters, such that the direction corresponding to the spatial filter having the largest arithmetic result is set. When the scanning region reaches a right end, it moves by one divided region in the lower direction, and scanning is again performed in the divided region unit in the right direction. This is repeated until the scanning region reaches a lowermost end.

Figure 24:
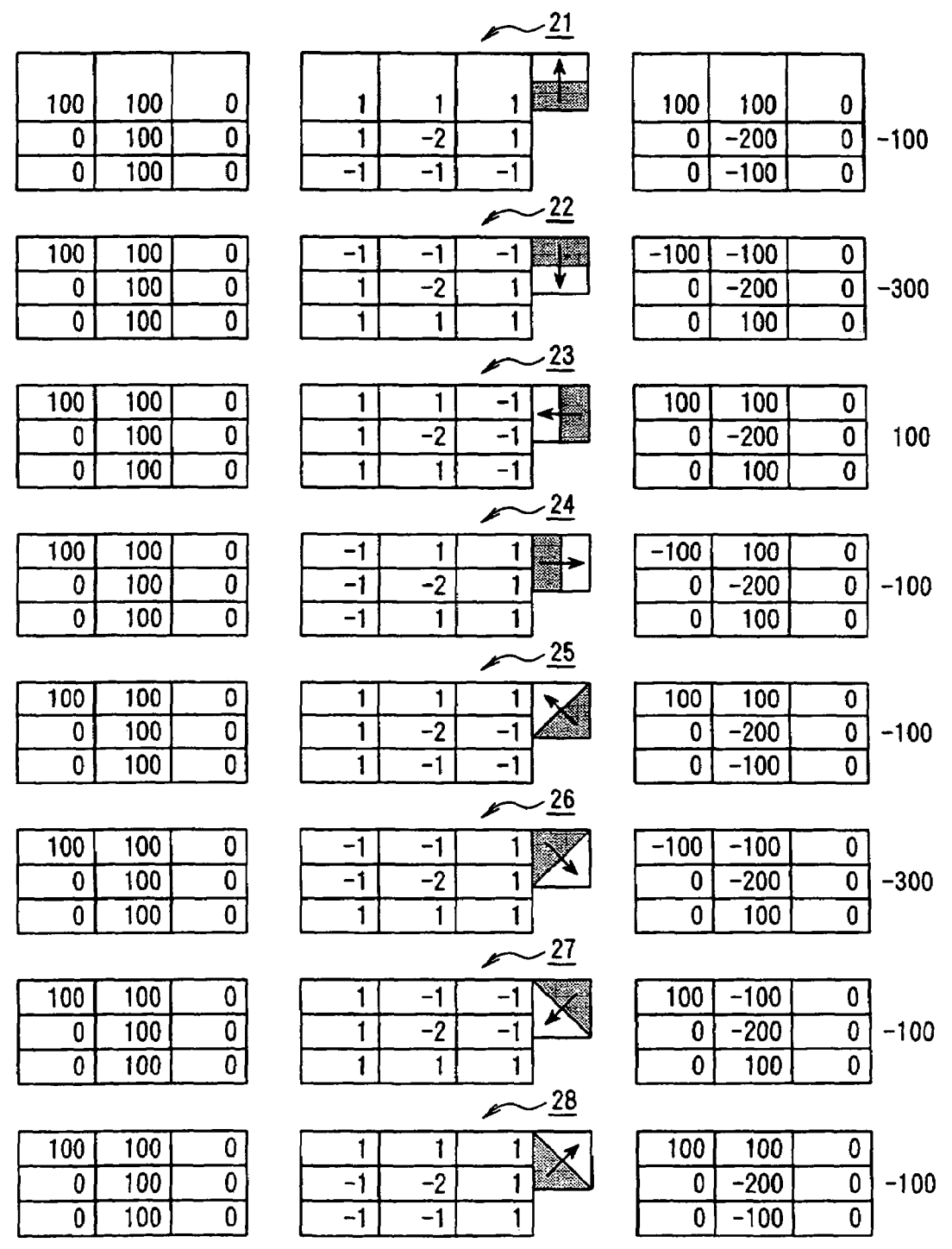

FIG. 24 is a diagram showing a case in which the direction of a divided region in a vertical direction edge is detected.

First, the case in which the direction of the divided region in the vertical direction edge is detected using the spatial filters 21 to 28 will be described. As shown in FIG. 24, with regards to the pixel values of the divided regions, a first row is set to (100, 100, 0), a second row is set to (0, 100, 0), and a third row is set to (0, 100, 0). Here, the pixel value '100' represents white, and the pixel value '0' represents black.

If the matrix arithmetic is performed on the pixel values of the divided regions by the spatial filters 21 to 28, the arithmetic results of the spatial filters 21 to 28 become '−100', '−300', '100', '−100', '−100', '−300', '−100' and '−100', respectively, and the arithmetic result of the spatial filter 23 has the largest value. And then, since the spatial filter 23 corresponds to the left direction, the direction of the divided region is detected as the left direction.

Figure 25:
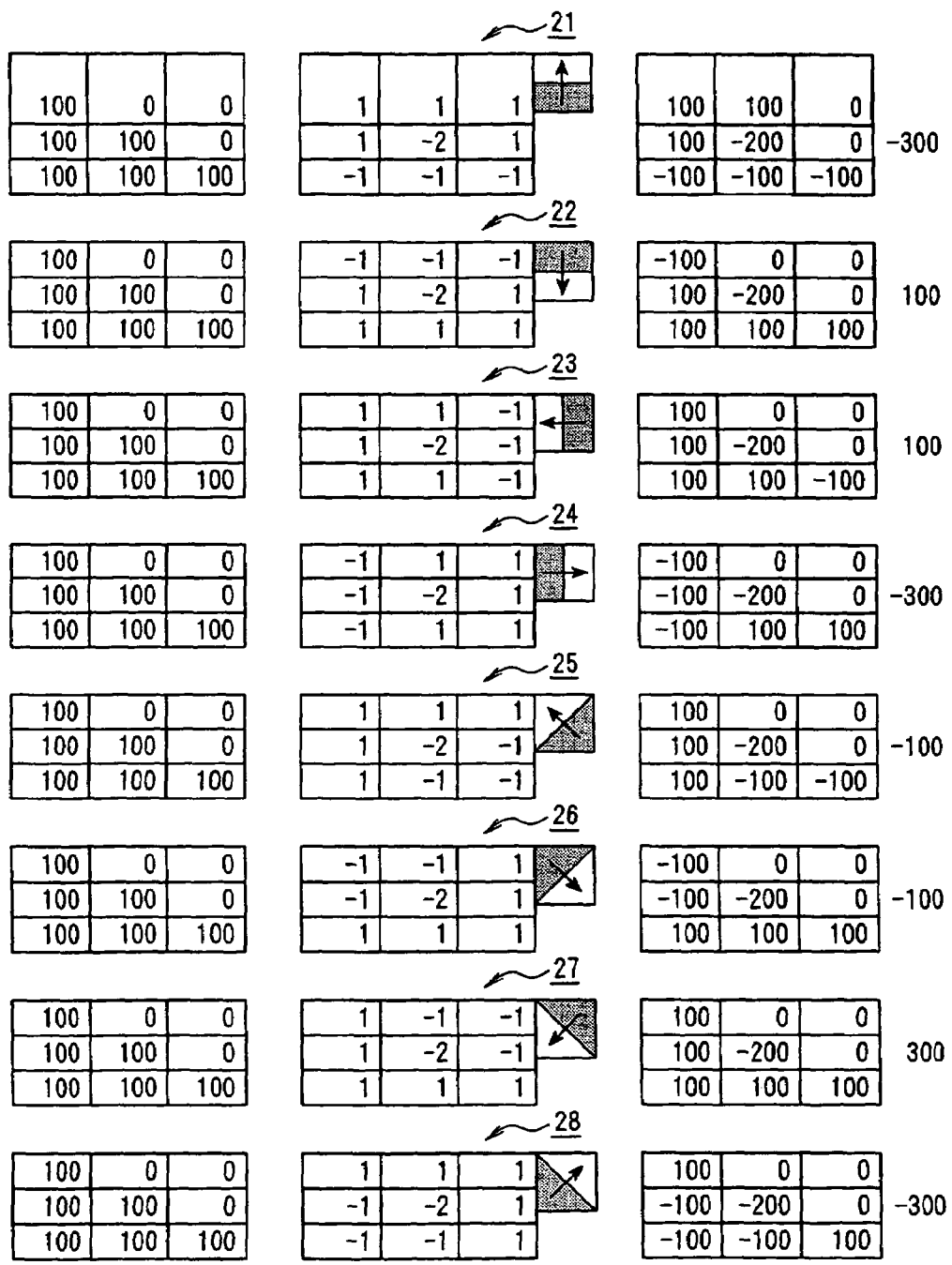
FIG. 25 is a diagram showing a case in which the direction of a divided region in an inclined direction edge is detected.

FIG. 25 is a diagram showing a case in which the direction of a divided region in an inclined direction edge is detected.

Next, the case in which the direction of the divided region in the inclined direction edge is detected using the spatial filters 21 to 28 will be described. As shown in FIG. 25, as regards the pixel values of the divided regions, the first row is set to (100, 0, 0), the second row is set to (100, 100, 0), and the third row is set to (100, 100, 100).

If the matrix arithmetic is performed on the pixel values of the divided regions by the spatial filters 21 to 28, the arithmetic results of the spatial filters 21 to 28 become '−300', '100', '100', '−300', '−100', '−100', '300', and '−300', respectively, and the and the arithmetic result of the spatial filter 27 has the largest value. And then, since the spatial filter 27 corresponds to the lower left direction, the direction of the divided region is detected as the lower left direction.

Figure 26:
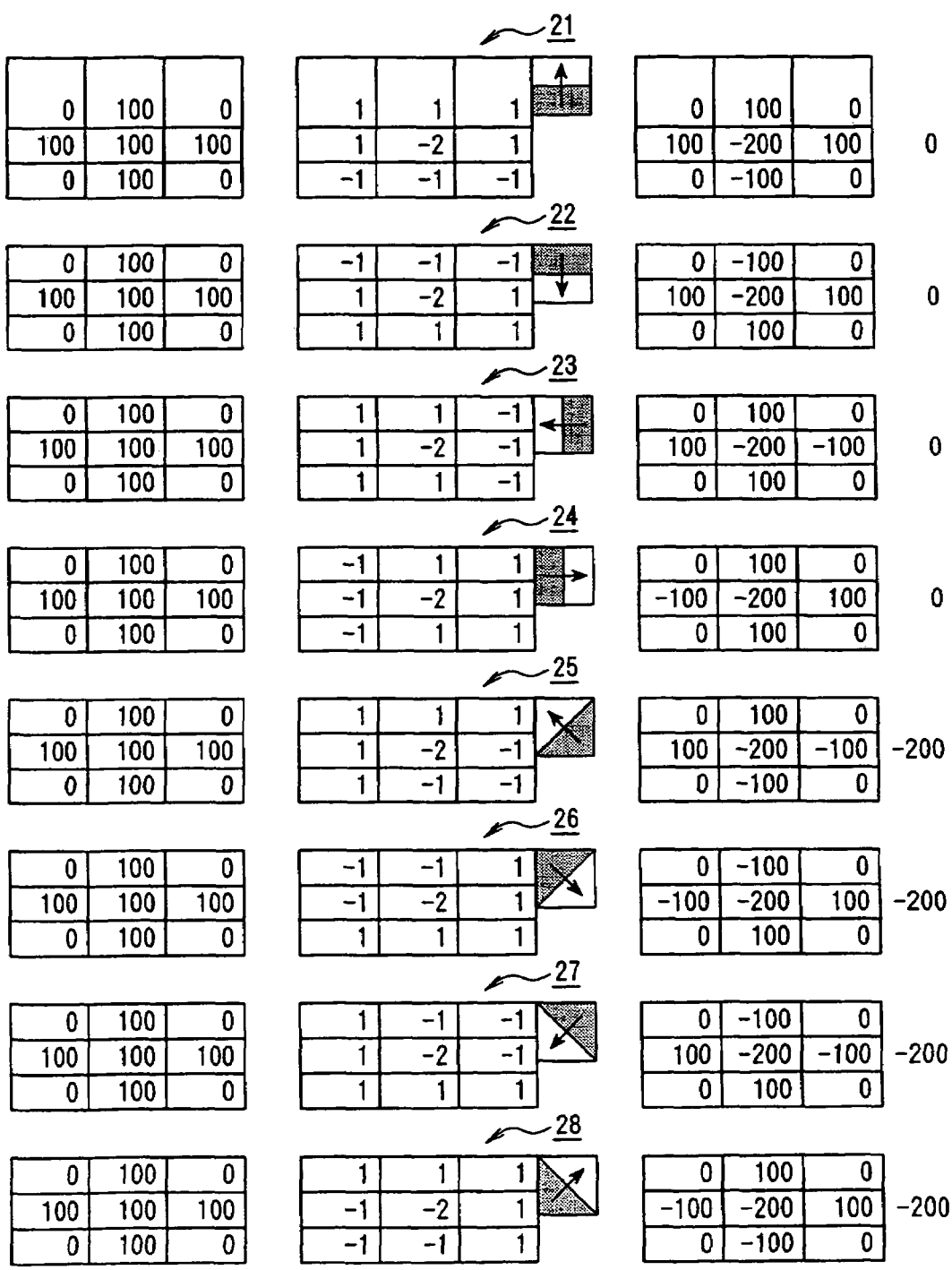
FIG. 26 is a diagram showing a case in which the direction of a divided direction cannot be specified.

FIG. 26 is a diagram showing a case in which the direction of a divided region cannot be specified.

Next, as shown in FIG. 26, the case in which the directions of the divided regions are detected, when as the pixel values, the first row is set to (0, 100, 0), the second row is set to (100, 100, 100), and the third row is set to (0, 100, 0), will be described.

If the matrix arithmetic is performed on the pixel values of the divided regions by means of the spatial filters 21 to 28, the arithmetic results of the spatial filters 21 to 28 become '0', '0', '0', '0', '−200', '−200', '−200', and '−200', respectively, and the spatial filter 27 spatial filter 27 having the arithmetic result of the largest value plurally exist. In this case, it is impossible to specify the directions of the divided regions. In such a manner, even though the direction of the divided regions cannot be specified, when they are connected by means of line segments, it is possible to interpolate by means of an interpolation processing from the periphery. Thus, it can be ignored.

Figure 27:
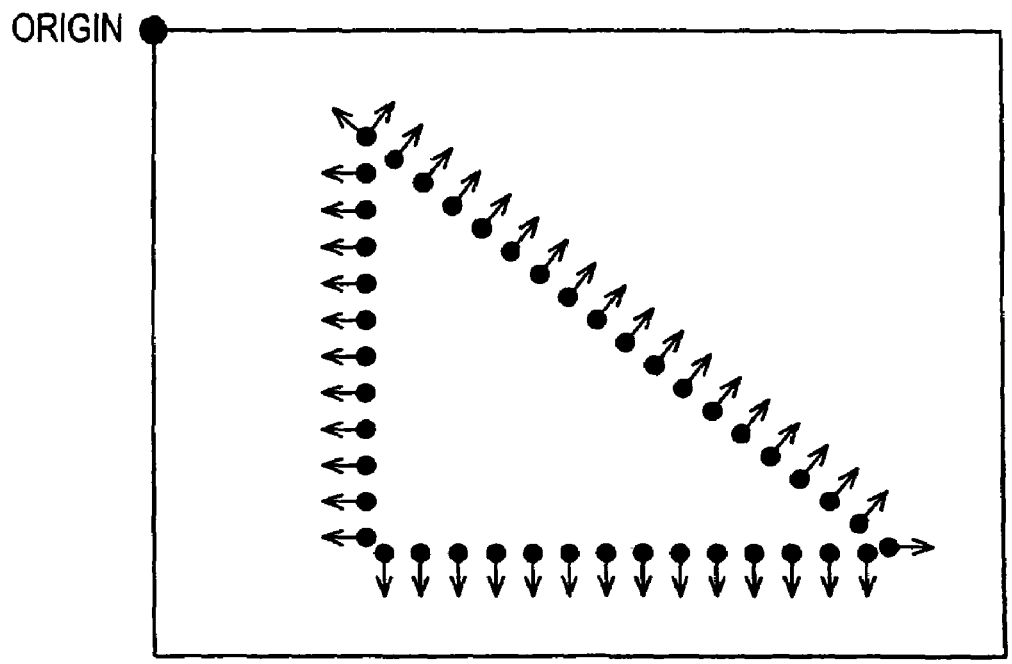
FIG. 27 is a schematic diagram showing results obtained by detecting the directions of the respective divided regions using spatial filters 21 to 28.

FIG. 27 is a diagram showing results obtained by detecting the directions of the respective divided regions of the image object 10 using spatial filters 21 to 28.

If the directions of the respective divided regions of the image object 10 are detected using the spatial filters 21 to 28, as shown in FIG. 27, it is possible to obtain a collection of the respective points tracing the outer line of the image object 10, and the directions and intensities of the edges in the respective points. In the example of FIG. 27, the direction of a point on the line AB is detected as the right direction, the direction of a point on the line BC is detected as the lower direction, and the direction of a point on the line CA is detected as the upper right direction.

Figure 28:
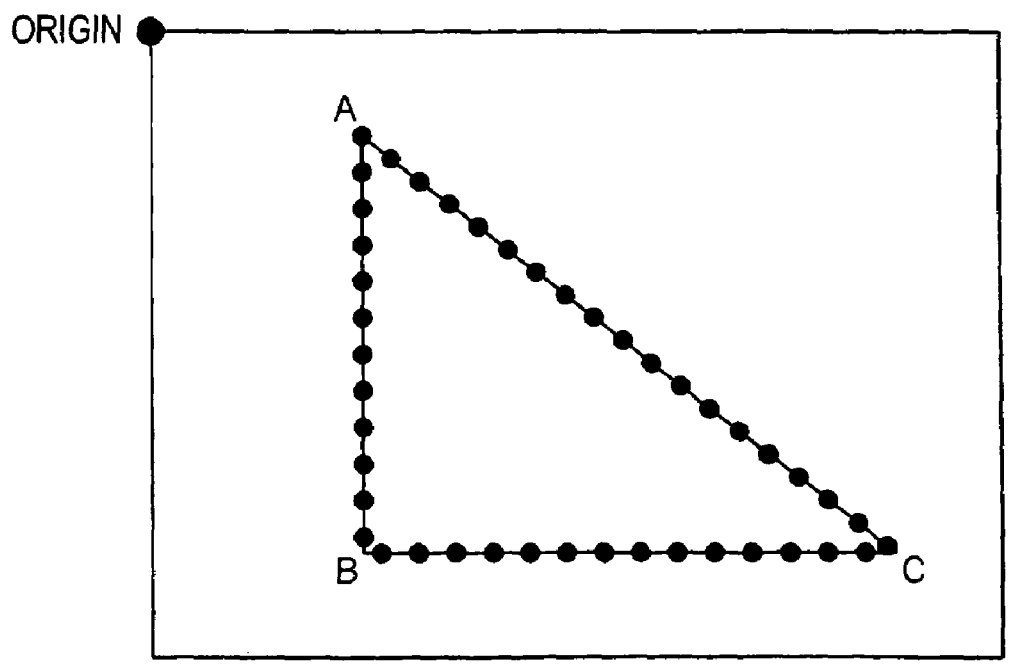
FIG. 28 is a schematic diagram showing a case in which an outer line of the image object 10 is obtained.

FIG. 28 is a diagram showing a case in which an outer line of the image object 10 is obtained.

In obtaining the outer line of the image object 10 from the state of FIG. 27, as shown in FIG. 28, an approximate line (a numerical expression of a segment) may be obtained from the collection of the points consecutive in the same direction through a regression analysis, without using the direction and intensity of the edge. In such a manner, the raster image can be converted into the vector image.

Next, the operation of the present exemplary embodiment will be described.

In the layout device 100, with going through the steps S200 and S202, raster image data is read, and based on the read raster image data, the raster image is converted into the vector image. Subsequently, with going through the step S204, based on vector image data obtained by the conversion, the respective vertexes of the image object 10 are detected as the guiding reference points.

And then, with going through the step S206, for every guiding reference point, two auxiliary lines are virtually formed to intersect the guiding reference point along the outline of the image object 10, and the direction in which the bisector line of the obtuse angle among the angles which the virtual auxiliary lines make extends outward from the guiding reference point, is calculated as the eye-flow guiding direction. Further, with going through the step S208, the central distance or the bosom distance for every guiding reference point is calculated as the eye-flow guiding intensity.

In such a manner, in the present exemplary embodiment, based on the raster image data, the raster image is converted into the vector image, and based on the vector image data obtained by the conversion, the guiding reference points are detected from the image object 10, and the eye-flow guiding directions and the eye-flow guiding intensities with respect to the detected guiding reference points are calculated.

Accordingly, even in the case of raster image data, it is possible to calculate quantitatively and relatively suitably in which direction the image object 10 tends to guide the eye-flow. Thus, it is possible to obtain quantitatively and relatively suitable eye flow as compared with the related art.

In the third exemplary embodiment, the step S204 corresponds to the guiding reference point detecting device of the exemplary embodiment 1 or 4, or the guiding reference point detecting of the exemplary embodiment 10, 13, 19, or 22, and the steps S206 and S208 correspond to the eye-flow guiding level calculating device of the exemplary embodiment 1 or 4, or the eye-flow guiding level calculating of the exemplary embodiment 10, 13, 19, or 22. Further, the step S206 corresponds to the eye-flow guiding direction calculating device of the exemplary embodiment 4 or 5, or the eye-flow guiding direction calculating of the exemplary embodiment 13, 14, 22, or 23, and the step S208 corresponds to the eye-flow guiding intensity calculating device of the exemplary embodiment 4, 6, or 8, or the eye-flow guiding intensity calculating of the exemplary embodiment 13, 15, 17, 22, 24, or 26.

Fourth Exemplary Embodiment

Hereinafter, a fourth exemplary embodiment of the present invention will be described with reference to the drawings. FIGS. 29 to 33 are diagrams showing the fourth exemplary embodiment of the eye-flow guiding level calculating system, the eye-flow guiding level calculating program, and the eye-flow guiding level calculation method according to exemplary embodiments of the present invention. Further, in the present exemplary embodiment, FIGS. 1 and 3 to 12, which are common to the first exemplary embodiment, are used for the description.

The present exemplary embodiment relates to the application of the eye-flow guiding level calculating system, the eye-flow guiding level calculating program, and the eye-flow guiding level calculating method according to exemplary embodiments of the present invention to a case in which the direction and intensity of guiding the eye-flow of the image object are calculated.

First, a construction of a layout device 100 to which exemplary embodiments of the present invention is applied will be described with reference to FIG. 1.

As shown in FIG. 1, the layout device 100 includes a CPU 30 to control arithmetic and an overall system based on a control program, a ROM 32 to previously store the control program of the CPU 30 and so on in a predetermined region, a RAM 34 to store data read from the ROM 32 and the like and arithmetic results required for an arithmetic process of the CPU 30, and an I/F 38 to mediate the input and output of data to external devices. These elements are communicatably connected to each other through a bus 39 serving as a signal line.

An input device 40 including a keyboard or a mouse which can input data as a human interface, a storage device 42 to store data or tables as a file, and a display device 44 to display an image based on an image signal are connected to the I/F 38 as external devices.

The CPU 30 is comprised of a micro processing unit (MPU) and the like and starts a predetermined program stored in a predetermined region of the ROM 32. And then, according to the program, an eye-flow guiding level calculation processing shown in a flow chart of FIG. 29 is performed.

FIG. 29 is a flow chart showing an eye-flow guiding level calculation processing.

The eye-flow guiding level calculation processing is a process in which the direction and intensity of guiding the eye-flow of an image object are calculated. As shown in FIG. 29, if it is executed in the CPU 30, first, the process progresses to step S300.

In the step S300, image data is read from the storage device 42, and then the process progresses to step S302. In the step S302, based on the read image data, a plurality of guiding reference points, serving as references which guide the eye-flow from the image object, are detected, and then the process progresses to step S304.

In the step S304, an eye-flow guiding direction which represents the direction of guiding the eye-flow is calculated for every detected guiding reference point, and then the process progresses to the step S306. In step S306, an eye-flow guiding intensity which represents the intensity of guiding the eye-flow is calculated for every the detected guiding reference point, and then the process progresses to step S308.

In the step S308, based on the calculated eye-flow guiding directions and the eye-flow guiding intensities, a representative eye-flow guiding level representative of the image object is calculated. Then, after a series of processes are completed, the process returns to the initial step.

Next, an image data input processing of the step S300 will be described in detail with reference to FIGS. 3 to 5.

As shown in FIG. 3, in the step S300, the image data of the vector image having the image object 10 is read from the storage device 42. In the example of FIG. 3, the image object 10 is a right-angled triangle.

As shown in FIG. 4, vector image data has a data structure in which the shape or size of the image object 10 is represented by numeric values. The vector image data may be constructed in a representative data format, such as SVG. In the example of FIG. 4, the coordinates of the respective vertexes of the image object 10 are designated in a tag (<polygon points>) showing that a polygon is drawn. This shows that the image object 10 is formed by drawing a line between adjacent designated coordinates.

As shown in FIG. 5, the vector image may be arranged on the two-dimensional coordinate space. In the example of FIG. 5, the vector image is arranged on the two-dimensional coordinate space with the upper left side of the vector image as an origin.

Next, a guiding reference point detection processing of the step S302 will be described in detail with reference to FIG. 6.

In the step S302, based on the read vector image data, the respective vertexes A to C of the image object 10 are detected as the guiding reference points. As shown in FIG. 4, in the case in which the coordinates of the respective vertexes A to C are included in the vector image data, it is possible to detect the guiding reference points by acquiring the coordinates of the respective vertexes A to C from the vector image data.

Moreover, in the case in which the coordinates of the respective vertexes A to C are not included in the vector image data, it is possible to obtain the guiding reference points by solving an equation of an outer line of the image object 10.

In the example of FIG. 6, the equation of a line connecting the vertexes A and B (hereinafter, referred to as a line AB) among the outer line of the image object 10 is represented by $X=2 (1 \leq Y \leq 5)$, and the equation of a line connecting the vertexes B and C (hereinafter, referred to as a line BC) among the outer line of the image object 10 is represented by $Y=5$ $(2 \leq X \leq 7)$. Further, the equation of a line connecting the vertexes C and A (hereinafter, referred to as a line CA) among the outer line of the image object 10 is represented by $Y=2X-3 (2 \leq X \leq 7)$. Thus, the coordinates of the respective vertexes A to C can be calculated by solving the equations of the lines. As a result, the coordinates of the respective vertexes A to C can be calculated as A(2, 1), B(2, 5) and C(5, 7).

Next, an eye-flow guiding direction calculation processing of the step S304 will be described in detail with reference to FIGS. 7 to 10.

In the step S304, for every guiding reference point, two auxiliary lines are virtually formed to intersect the guiding reference point, and the direction in which a bisector line of an obtuse angle among angles which the virtual auxiliary lines make extends outward from the guiding reference point is calculated as an eye-flow guiding direction.

As shown in FIG. 7, when the eye-flow guiding directions at the guiding reference points A to C are a to c, the virtual auxiliary lines of the guiding reference point A are the line AB and the line CA, the virtual auxiliary lines of the guiding reference point B are the line AB and the line BC, and the virtual auxiliary lines of the guiding reference point C are the line CA and the line BC, the eye-flow guiding directions a to c can be calculated as (−2.5, −4), (−2.5, 2), and (5, 2) by the above-mentioned equations (1) to (3), respectively.

In addition, if the coordinates are normalized in a vector of a size '1', the eye-flow guiding directions a to c can be calculated as (−0.53, −0.85), (−0.78, 0.62), and (0.93, 0.37) by the above-mentioned equations (4) to (6), respectively.

Further, when the direction of three o'clock is set to 0°, an angle of the eye-flow guiding direction, in particular, the eye-flow guiding direction a, can be calculated as '122°' by the above-mentioned equation (7), as described in FIG. 8.

Similarly, an angle of the eye-flow guiding direction b can be calculated as '219°' by the above-mentioned equation (8), as shown in FIG. 9.

Similarly, an angle of the eye-flow guiding direction c can be calculated as '338°' by the above-mentioned equation (9), as shown in FIG. 10.

Next, an eye-flow guiding intensity calculation processing of the step S306 will be described in detail with reference to FIG. 11.

In the step S306, for every guiding reference point, a distance from the center G of the image object 10 up to the guiding reference point (hereinafter, referred to as a central distance) is calculated as the eye-flow guiding intensity.

FIG. 11 is a diagram showing a central distance from a guiding reference point.

The coordinate of the center G of the image object 10 can be calculated as (3.67, 3.67) by the above-mentioned equation (10), as shown in FIG. 11.

Therefore, the central distances from the respective vertexes A to C can be calculated as '3.14', '2.13', and '3.59' by the above-mentioned equations (11) to (13).

Accordingly, as shown in FIG. 12, the eye-flow guiding direction and the eye-flow guiding intensity at the guiding reference point A can be calculated as (−0.53, −0.85) and '3.14'. This shows that the eye-flow is guided in the direction of (−0.53, −0.85) and the size of '3.14' with the vertex A of the image object 10 as a reference.

The eye-flow guiding direction and the eye-flow guiding intensity at the guiding reference point B can be calculated as (−0.78, 0.62) and '2.13'. This shows that the eye-flow is guided in the direction of (−0.78, 0.62) and the size of '2.13' with the vertex B of the image object 10 as a reference.

The eye-flow guiding direction and the eye-flow guiding intensity at the guiding reference point C can be calculated as (0.93, 0.37) and '3.59'. This shows that the eye-flow is guided in the direction of (0.93, 0.37) and the size of '3.59' with the vertex C of the image object 10 as a reference.

Next, a representative eye-flow guiding level calculation processing of the step S308 will be described in detail with reference to FIGS. 30 and 31.

In the step S308, for every guiding reference point, the representative eye-flow guiding level is calculated by performing vector composition on the calculated eye-flow guiding directions and the eye-flow guiding intensities.

FIG. 30 is a diagram showing a case in which vector composition is performed to the eye-flow guiding directions and eye-flow guiding intensities of the respective guiding reference points.

Figures 31, 32:
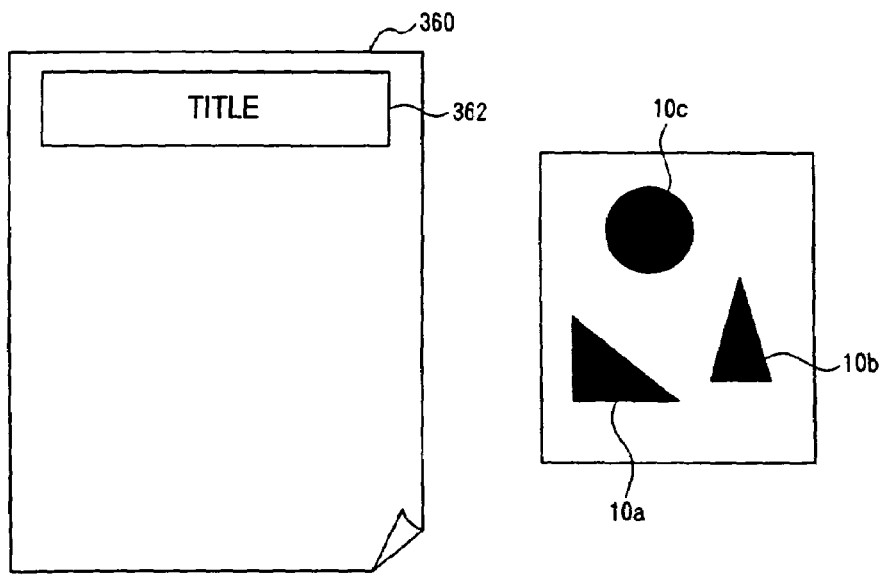
FIG. 31 is a table showing eye-flow guiding vectors of the respective guiding reference points.
FIG. 32 is a schematic diagram showing a case in which a page is laid out using a layout template.

FIG. 31 is a table showing eye-flow guiding vectors of the respective guiding reference points.

In order to calculate the representative eye-flow guiding level, first, the eye-flow guiding vectors of the respective guiding reference points are obtained. When the eye-flow guiding vectors at the guiding reference points A to C are ax to cx, the eye-flow guiding vector ax can be calculated by multiplying the eye-flow guiding direction a by the eye-flow guiding intensity at the guiding reference point A as show in FIGS. 30 and 31. As a result, the eye-flow guiding vector ax can be calculated as (−1.6642, −2.669).

The eye-flow guiding vector bx can be calculated as (−1.6615, −1.3206) by multiplying the eye-flow guiding direction b by the eye-flow guiding intensity at the guiding reference point B.

The eye-flow guiding vector cx can be calculated as (3.3387, 1.3283) by multiplying the eye-flow guiding direction c by the eye-flow guiding intensity at the guiding reference point C.

And then, the representative eye-flow guiding level can be calculated as (0.013, −0.020) by performing vector composition on the eye-flow guiding vectors ax to cx.

Hereinafter, the operation of the present exemplary embodiment will be described.

In the layout device 100, with going through the steps S300 and S302, vector image data is read, and based on the read vector image data, the respective vertexes of the image object 10 are detected as the guiding reference points.

And then, with going through the step S304, for every guiding reference point, two auxiliary lines are formed to intersect the guiding reference point along the outline of the image object 10, and the direction in which a bisector line of an obtuse angle among the auxiliary lines make extends outward from the guiding reference point is calculated as the eye-flow guiding direction. Further, with going through the step S306, for every guiding reference point, the central distance is calculated as the eye-flow guiding intensity.

Then, with going through the step S308, for every guiding reference point, the representative eye-flow guiding level is calculated by performing vector composition on the calculated eye-flow guiding directions and the eye-flow guiding intensities.

The representative eye-flow guiding level can be applied to a case in which a layout is performed on a plurality of layout elements.

FIG. 32 is a diagram showing a case in which a page is laid out using a layout template.

As shown in FIG. 32, it can be considered that, when a page is laid out using a layout template in which a title information storing frame 362 to store title information is arranged in a layout region 360, the title information of an article is stored in the title information storing frame 362, and three image objects 10*a* to 10*c* are arranged in other blank portions.

Figure 33:
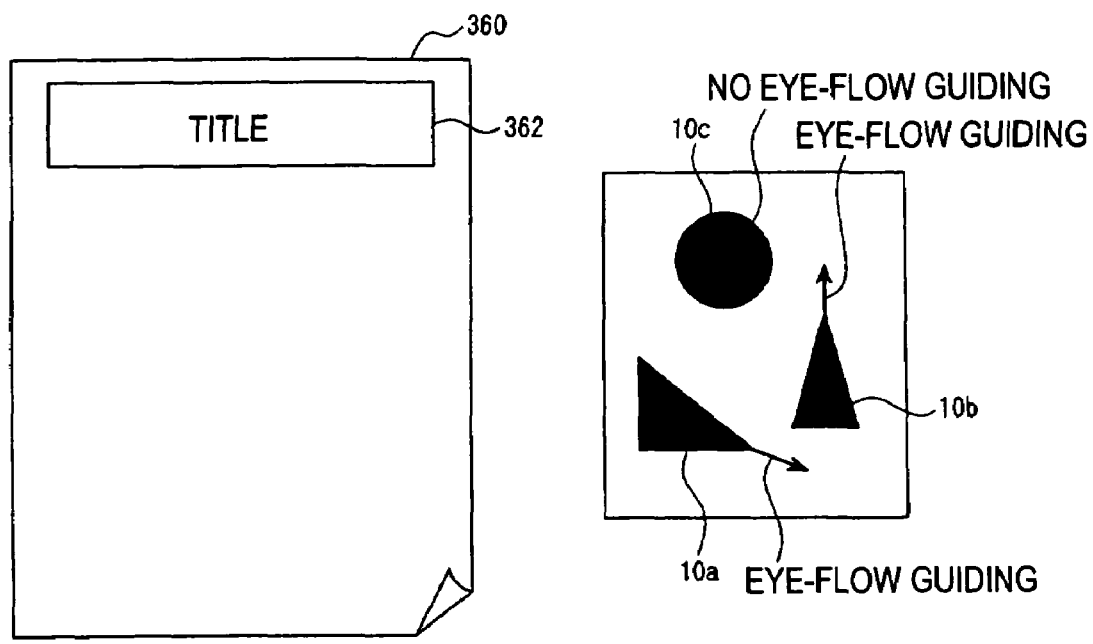
FIG. 33 is a schematic diagram showing a case in which a representative eye-flow guiding level is displayed.

FIG. 33 is a diagram showing a case in which a representative eye-flow guiding level is displayed.

In many cases, an editor strays how he arranges the image objects 10*a* to 10*c*. Therefore, as shown in FIG. 33, the representative eye-flow guiding levels of the respective image objects 10*a* to 10*c* are calculated and displayed, respectively. In the example of FIG. 33, the representative eye-flow guiding level of the image object 10*a* has a predetermined size in the lower right direction, and the representative eye-flow guiding level of the image object 10*b* has a predetermined size in the upper direction. To the contrary, the representative eye-flow guiding level of the image object 10*c* does not have any direction and size.

Figure 34:
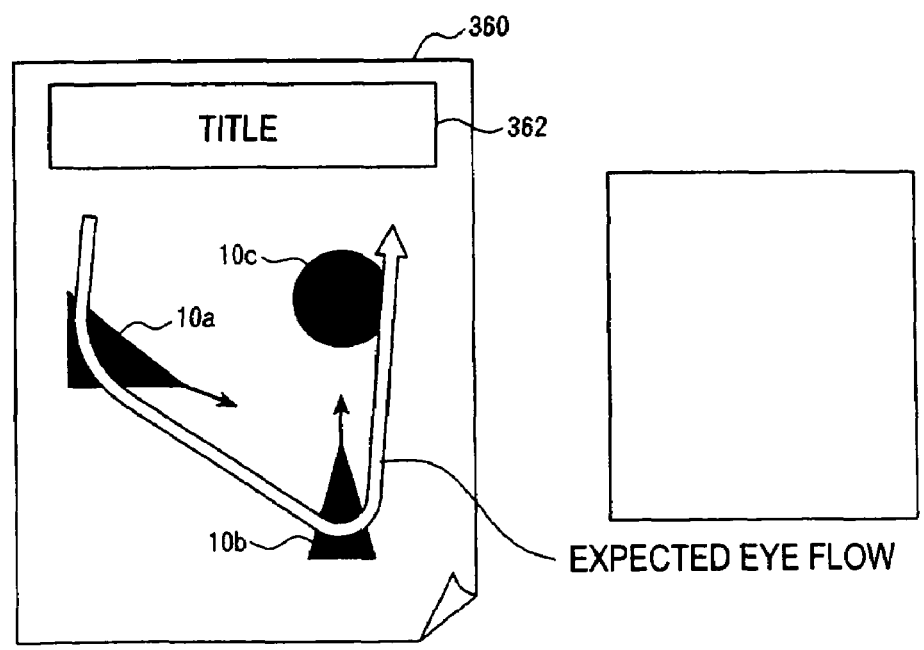
FIG. 34 is a schematic diagram showing a case in which image objects 10a to 10c are arranged with reference to a representative eye-flow guiding level.

FIG. 34 is a diagram showing a case in which the image objects 10*a* to 10*c* are arranged with reference to a representative eye-flow guiding level.

From the viewpoint of realizing a readable layout, it is preferable to arrange the image objects 10*a* to 10*c*, without the intermittence or intersection of the eye flow. Therefore, as shown in FIG. 34, if the image object 10*a* is arranged at the left center of the layout region 360, the image object 10*b* is arranged at the lower right side of the image object 10*a*, and the image object 10*c* is arranged over the image object 10*b*, the eye flow is consecutive in the sequence of the left center, the lower right, and the right center of the layout region 360.

In such a manner, in the present exemplary embodiment, a plurality of guiding reference points is detected from the image object 10 based on the vector image data, and, for every detected guiding reference point, the eye-flow guiding direction and the eye-flow guiding intensity with respect to the guiding reference point are calculated. Further, based on the calculated eye-flow guiding directions and eye-flow guiding intensities, the representative eye-flow guiding level is calculated.

According to this construction, it is possible to calculate quantitatively and relatively suitably in which direction the image object 10 tends to guide the eye-flow. Thus, it is possible to quantitatively obtain the relatively suitable eye flow as compared with the related art. Further, it is possible to detect the representative eye-flow guiding level representative of the image object 10. Thus, in the case in which the layout is performed on the plurality of layout elements, it is possible to perform the layout operation relatively simple. Further, since it is not necessary to provide an additional apparatus, such as a camera, the device does not have a large scale and high cost is not required. Thus, it has an advantage in that it is possible to plan the miniaturization and low cost of the device, as compared with the related art. In addition, since a method, such as learning, is not used to calculate the eye-flow guiding level, it has also an advantage in that it is possible to obtain relatively surely the suitable eye flow.

In addition, in the present exemplary embodiment, based on the vector image data, the vertex of the image object 10 is detected as the guiding reference point.

The eye-flow tends to be guided from the inside of the image object 10 toward the vertex. Therefore, by detecting the vertex of the image object 10 as the guiding reference point, it is possible to further suitably calculate in which direction the image object 10 tends to guide the eye-flow.

In addition, in the present exemplary embodiment, the two auxiliary lines are virtually formed to intersect the guiding reference point along the outline of the image object 10, and the direction in which the bisector line of the obtuse angle among the angles which the virtual auxiliary lines make extends outward from the guiding reference point, is calculated as the eye-flow guiding direction.

According to this construction, it is possible to calculate the direction from the inside of the image object 10 toward the vertex as the eye-flow guiding direction, and thus it is possible to further suitably calculate in which direction the image object 10 tends to guide the eye-flow.

In addition, in the present exemplary embodiment, the central distance from the guiding reference point is calculated as the eye-flow guiding intensity.

The more an angle of the vertex of the image object 10 is sharpened, the more the eye-flow tends to be guided. Further, the more the angle of the vertex is sharpened, the larger the central distance is. Therefore, it is possible to calculate the eye-flow guiding intensity depending on the angle of the vertex of the image object 10. Thus, it is possible to further suitably calculate in which direction the image object 10 tends to guide the eye-flow.

In the fourth exemplary embodiment, the step S302 corresponds to the guiding reference point detecting device of any one of the exemplary embodiments 2 to 4, or the guiding reference point detecting of any one of the exemplary embodiments 11 to 13 or 20 to 22, and the steps S304 and S306 correspond to the eye-flow guiding level calculating device of the exemplary embodiment 2 or 4, or the eye-flow guiding level calculating of the exemplary embodiment 11, 13, 20, or 22. Further, the step S304 corresponds to the eye-flow guiding direction calculating device of the exemplary embodiment 4 or 5, or the eye-flow guiding direction calculating of the exemplary embodiment 13, 14, 22, or 24, and the step S306 corresponds to the eye-flow guiding intensity calculating device of the exemplary embodiment 4 or 6, or the eye-flow guiding intensity calculating of the exemplary embodiment 13, 15, 22, or 24. Further, the step S308 corresponds to the representative eye-flow guiding level calculating device of the exemplary embodiment 2 or the representative eye-flow guiding level calculating of the exemplary embodiment 11 or 20.

Fifth Exemplary Embodiment

Next, a fifth exemplary embodiment the eye-flow guiding level calculating system, the eye-flow guiding level calculating program, and the eye-flow guiding level calculation method according to exemplary embodiments of the present invention will be described with reference to FIGS. 16 to 19, which are common to the second exemplary embodiment.

The present exemplary embodiment relates to the application of the eye-flow guiding level calculating system, the eye-flow guiding level calculating program, and the eye-flow guiding level calculating method according to exemplary embodiments of the present invention to a case in which the direction and intensity of guiding the eye-flow of the image object 10 are calculated. The present exemplary embodiment is different from the fourth exemplary embodiment in that a distance from a sideline opposite to the guiding reference point among the outer line of the image object 10 (hereinafter, referred to as an opposite sideline) up to the guiding reference point is calculated as the eye-flow guiding intensity. Hereinafter, only different portions from those of the fourth exemplary embodiment will be described. Further, the same elements as those of the first exemplary embodiment are represented by the same reference numerals, and the descriptions thereof will be omitted.

An eye-flow guiding intensity calculation processing of the step S306 will be described in detail with reference to FIGS. 16 to 19.

In the step S306, for every guiding reference point, an auxiliary line is virtually formed to pass through the guiding reference point in the eye-flow guiding direction, and a distance (hereinafter, referred to as a bosom distance) from a point, at which the virtual auxiliary line intersects an opposite sideline, up to the guiding reference point is calculated as the eye-flow guiding intensity.

In order to obtain the bosom distance, first, the coordinate of the point at which the virtual auxiliary line intersects the opposite sideline is obtained. As regards the guiding reference point A, as shown in FIGS. 16 and 17, the equation of the virtual auxiliary line is represented by $y=1.6x-2.2$, and the equation of the opposite sideline is represented by $y=5$. Thus, the coordinate of an intersection A' of the two lines can be calculated by solving the equations of the respective lines. As a result, the coordinate of the intersection A' can be calculated as (4.5, 5).

As regards the guiding reference point B, the equation of the virtual auxiliary line is represented by $y=-0.8x+6.6$, and the equation of the opposite sideline is represented by $y=0.8x-0.6$. Thus, by solving the equations of the respective lines, the coordinate of an intersection B' of the two lines can be calculated can be calculated as (4.5, 3).

As regards the guiding reference point C, the equation of the virtual auxiliary line is represented by $y=0.4x+2.2$, and the equation of the opposite sideline is represented by $x=2$.

Thus, by solving the equations of the respective lines, the coordinate of an intersection C' of the two lines can be calculated as (2, 3).

Next, the bosom distances from the respective guiding reference points A to C are calculated based on the coordinates of the intersections A' to C'. Since the bosom distance from the guiding reference point A is a distance from the intersection A' up to the guiding reference point A, as shown in FIG. 18, it is calculated as '4.72'.

Since the bosom distance from the guiding reference point B is a distance from the intersection B' up to the guiding reference point B, it is calculated as '3.20'.

Since the bosom distance from the guiding reference point C is a distance from the intersection C' up to the guiding reference point C, it is calculated as '5.38'.

Accordingly, as shown in FIG. 19, the eye-flow guiding direction and the eye-flow guiding intensity at the guiding reference point A can be calculated as (−0.53, −0.85) and '4.72'. This shows that the eye-flow is guided in the direction of (−0.53, −0.85) and the size of '4.72' with the vertex A of the image object 10 as a reference.

The eye-flow guiding direction and the eye-flow guiding intensity at the guiding reference point B can be calculated as (−0.78, 0.62) and '3.20'. This shows that the eye-flow is guided in the direction of (−0.78, 0.62) and the size of '3.20' with the vertex B of the image object 10 as a reference.

The eye-flow guiding direction and the eye-flow guiding intensity at the guiding reference point C can be calculated as (0.93, 0.37) and '5.38'. This shows that the eye-flow is guided in the direction of (0.93, 0.37) and the size of '5.38' with the vertex C of the image object 10 as a reference.

Next, the operation of the present exemplary embodiment will be described.

In the layout device 100, with going through the steps S300 and S302, vector image data is read, and based on the read vector image data, the respective vertexes of the image object 10 are detected as the guiding reference points.

And then, with going through the step S304, for every guiding reference point, two auxiliary lines are virtually formed to intersect the guiding reference point along the outline of the image object 10, and the direction in which the bisector line of the obtuse angle among the angles which the virtual auxiliary lines make extends outward from the guiding reference point is calculated the eye-flow guiding direction. Further, with going through the step S306, for every guiding reference point, the bosom distance is calculated as the eye-flow guiding intensity.

Then, with going through the step S308, for every guiding reference electrode, the representative eye-flow guiding level is calculated by performing vector composition on the calculated eye-flow guiding direction and eye-flow guiding intensity.

In such a manner, in the present exemplary embodiment, the bosom distance from the guiding reference point is calculated as the eye-flow guiding intensity.

The more an angle of the vertex of the image object 10 is sharpened, the more the eye-flow tends to be guided. Further, the more the angle of the vertex is sharpened, the larger the bosom distance is. Therefore, it is possible to calculate the eye-flow guiding intensity depending on the angle of the vertex of the image object 10. Thus, it is possible to relatively suitably calculate in which direction the image object 10 tends to guide the eye-flow.

In the fifth exemplary embodiment, the step S302 corresponds to the guiding reference point detecting device of any one of the exemplary embodiments 2 to 4, or the guiding reference point detecting of any one of the exemplary embodiments 11 to 13 and 20 to 22, and the steps S304 and S306 correspond to the eye-flow guiding level calculating device of the exemplary embodiments 2 or 4, or the eye-flow guiding level calculating of the exemplary embodiment 11, 13, 20, or 22. Further, the step S304 corresponds to the eye-flow guiding direction calculating device of the exemplary embodiment 4 or 5, or the eye-flow guiding direction calculating of the exemplary embodiment 13, 14, 22, or 23, and the step S306 corresponds to the eye-flow guiding intensity calculating device of the exemplary embodiment 4 or 8, or the eye-flow guiding intensity calculating of the exemplary embodiment 13, 17, 22, or 26. Further, the step S308 corresponds to the representative eye-flow guiding level calculating device of the exemplary embodiment 2, or the representative eye-flow guiding level calculating of the exemplary embodiment 11 or 20.

Sixth Exemplary Embodiment

Next, a sixth exemplary embodiment of the present invention will be described with reference to the drawings. FIGS. 35 and 36 are diagrams showing the sixth exemplary embodiment of the eye-flow guiding level calculating system, the eye-flow guiding level calculating program, and the eye-flow guiding level calculation method according to exemplary embodiments of the present invention.

The present exemplary embodiment relates to the application of the eye-flow guiding level calculating system, the eye-flow guiding level calculating program, and the eye-flow guiding level calculating method according to exemplary embodiments of the present invention to a case in which the direction and intensity of guiding the eye-flow of the image object 10 are calculated. The present exemplary embodiment is different from the fourth and fifth exemplary embodiments in that a distance from one point on a path passing through a vertex other than the guiding reference point of the image object up to the guiding reference point is calculated the eye-flow guiding intensity. Hereinafter, only different portions from those of the fourth and fifth exemplary embodiments will be described. Further, the same elements as those of the fourth and fifth exemplary embodiments are represented by the same reference numerals, and the descriptions thereof will be omitted.

An eye-flow guiding intensity calculation processing of the step S306 will be described in detail with reference to FIG. 35.

Figure 35A:
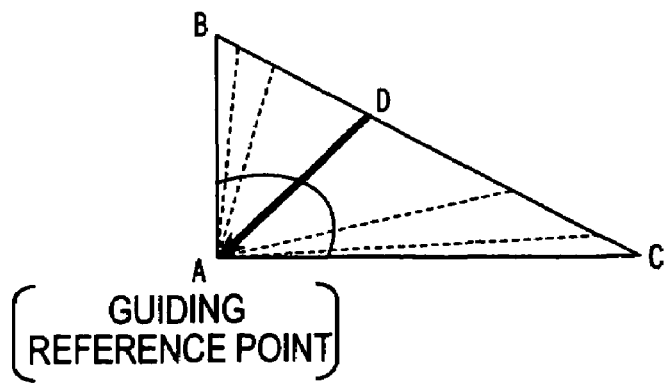
FIGS. 35A to 35C are schematic diagrams showing a bosom distance from a guiding reference point when a virtual auxiliary line is formed along the edge of an image.
Figure 35B:
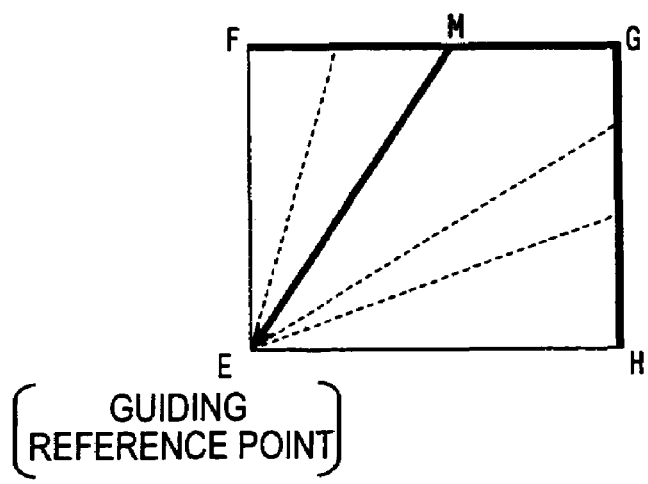
Figure 35C:
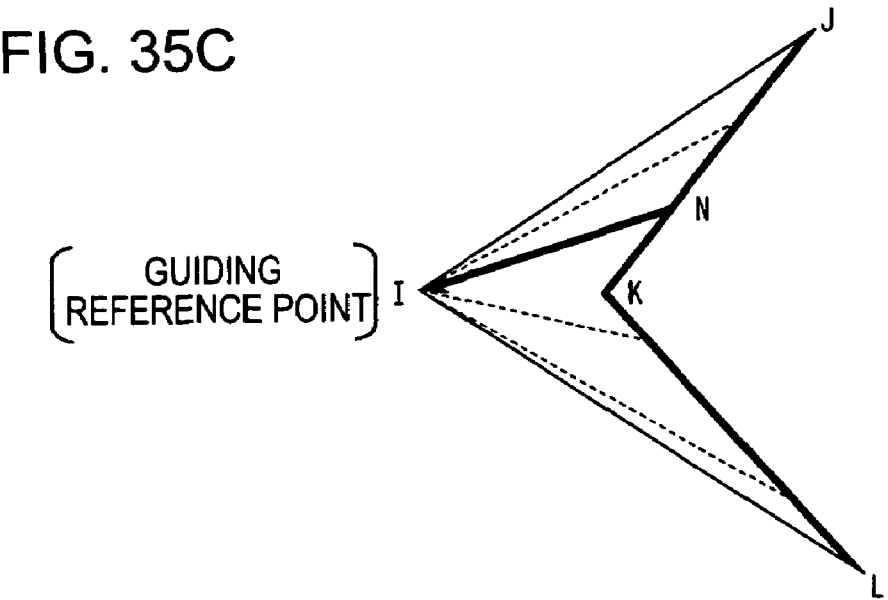

FIGS. 35A to 35C are diagrams showing a bosom distance from a guiding reference point when a virtual auxiliary line is formed along the edge of an image.

In the step S306, for every guiding reference point of the respective image objects, a line passing through a vertex other than a vertex serving as the guiding reference point in the image object is virtually formed, and the coordinate of one point on the virtual auxiliary line for obtaining the eye-flow guiding intensity is determined. And then, a distance (hereinafter, referred to as a bosom distance) from the determined one point up to the guiding reference point is calculated as the eye-flow guiding intensity.

In obtaining the bosom distance, first, the virtual auxiliary line is formed.

As regards a triangular image object shown in FIG. 35A, since the guiding reference point is the vertex A, a line segment BC passing through the vertexes B and C other than the vertex A becomes the virtual auxiliary line.

Further, as regards a rectangular image object shown in FIG. 35B, since the guiding reference point is a vertex E, a line segment FGH passing through vertexes F to H other than the vertex E becomes the virtual auxiliary line.

Further, as regards a wedge-shaped image object shown in FIG. 35C, since the guiding reference point is a vertex I, a line segment JKL passing through vertexes J to L other than the vertex I becomes the virtual auxiliary line.

Next, in order to calculate the eye-flow guiding intensity, the coordinate of the one point on the virtual auxiliary line is determined.

As regards the triangular image object shown in FIG. 35A, a point D on the line segment BC having the vertexes B and C is determined. In addition, a direction extending from the one point on the virtual auxiliary line to the guiding reference point is calculated as the eye-flow guiding direction.

Further, as regards the rectangular image object shown in FIG. 35B, a point M on the line segment FGH having the three vertexes F to H is determined. In addition, a direction extending from the one point on the virtual auxiliary line to the guiding reference point is calculated as the eye-flow guiding direction.

Furthermore, as regards the wedge-shaped image object shown in FIG. 35C, a point N on the line segment JKL having the three vertexes J to L is determined. In addition, a direction extending from the one point on the virtual auxiliary line to the guiding reference point is calculated as the eye-flow guiding direction.

The coordinate of the determined one point is obtained by associating a two-dimensional coordinate space with the image object, as shown in FIG. 16 used for the description of the above-mentioned fifth exemplary embodiment.

In addition, a bosom distance from the coordinate of the guiding reference point and the coordinate of the determined one point on the virtual auxiliary line is calculated.

As regards the triangular image object shown in FIG. 35A, the distance of a line segment DA, which is indicated by a solid line in FIG. 35A, from the coordinate of the guiding reference point A and the coordinate of the point D on the line segment BC is calculated.

As regards the rectangular image object shown in FIG. 35B, the distance of a line segment ME, which is indicated by a solid line in FIG. 35B, from the coordinate of the guiding reference point E and the coordinate of the point M on the line segment FGH is calculated.

As regards the wedge-shaped image object shown in FIG. 35C, the distance of a line segment NI, which is indicated by a solid line in FIG. 35C, from the coordinate of the guiding reference point I and the coordinate of the point N on the line segment JKL is calculated.

In such a manner, with respect to the image objects shown in FIGS. 35A to 35C, the eye-flow guiding directions and the eye-flow guiding intensities are obtained respectively.

In the example of FIGS. 35A to 35C, the case in which the virtual auxiliary line is formed along the edge of the image is described. However, exemplary embodiments of the present invention are not limited to this case. For example, as shown in FIGS. 36A to 36C, a virtual auxiliary line may be formed along the edge of a circumscribed figure.

Hereinafter, an eye-flow guiding intensity calculation processing of the step S306 will be described in detail with reference to FIGS. 36A to 36C.

Figure 36A:
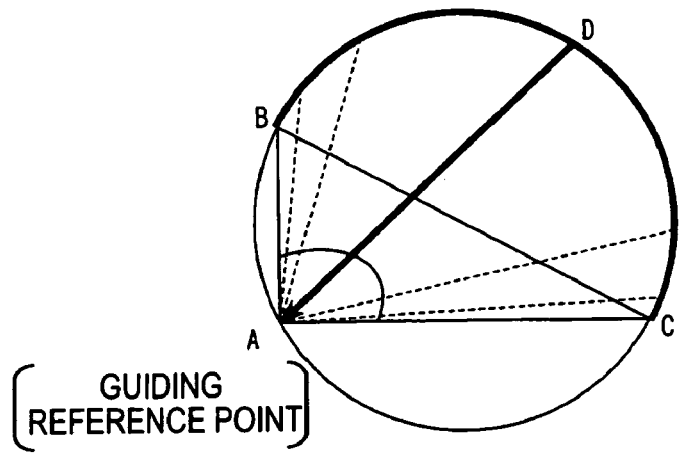
FIGS. 36A to 36C are schematic diagrams showing a bosom distance from a guiding reference point when a virtual auxiliary line is formed along the edge of a circumscribed figure.
Figure 36B:
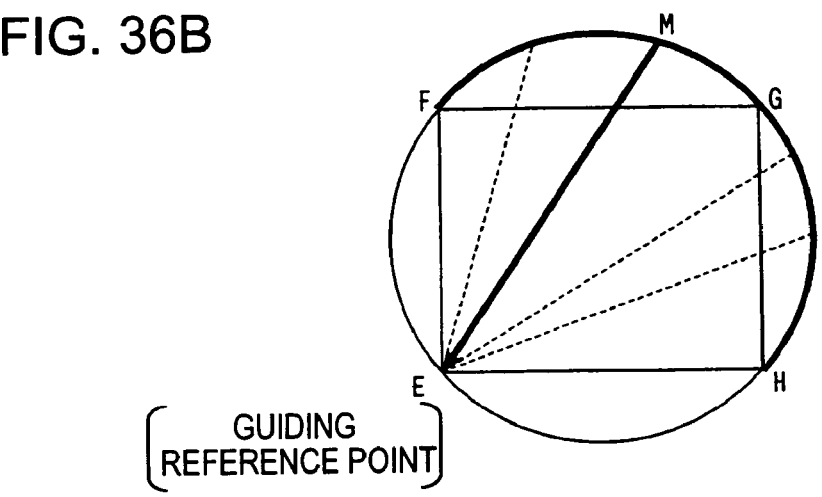
Figure 36C:
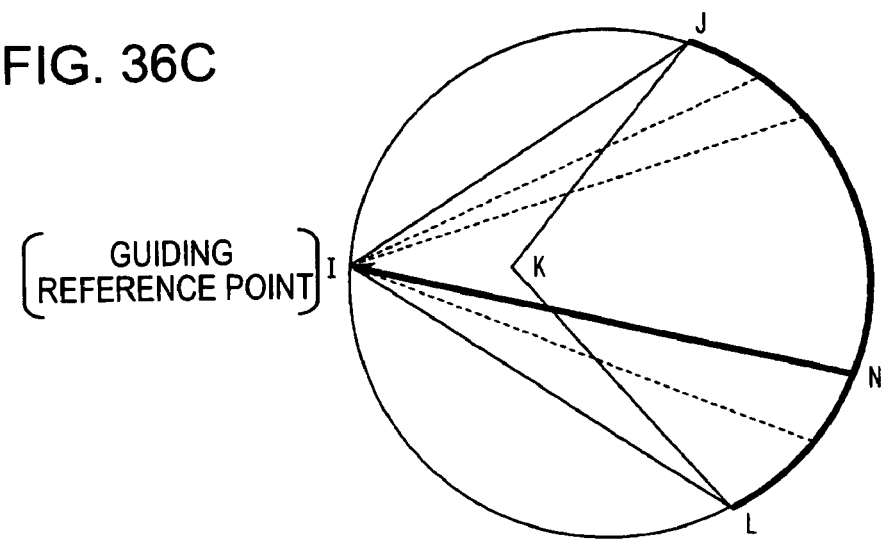

FIGS. 36A to 36C are diagrams showing a bosom distance from a guiding reference point when a virtual auxiliary line is formed along the edge of a circumscribed figure.

In obtaining the bosom distance, first, the virtual auxiliary line is formed.

As regards a triangular image object shown in FIG. 36A, it is assumed that a circumscribed circle passes through vertexes A to C. Since the guiding reference point is the vertex A, a circular arc BC of the circumscribed circle passing through the other vertexes B and C becomes the virtual auxiliary line.

Further, as regards a rectangular image object shown in FIG. 36B, it is assumed that a circumscribed circle passes through vertexes E to H. Since the guiding reference point is the vertex E, a circular arc FGH of the circumscribed circle passing through the other vertexes F to H becomes the virtual auxiliary line.

Further, as regards a wedge-shaped image object shown in FIG. 36C, it is assumed that a circumscribed circle passes through vertexes I, J and L. Since the guiding reference point is the vertex I, a circular arc JL of the circumscribed circle passing through the other vertexes J and L becomes the virtual auxiliary line. Like the wedge-shaped image object, in an image object in which a portion of the projection other than the guiding reference point is hollowed inward, the virtual auxiliary line may be formed so as not to include a vertex of the portion.

Next, in order to calculate the eye-flow guiding intensity, the coordinate of the one point on the virtual auxiliary line is determined.

In the triangular image object shown in FIG. 36A, a point D on the circular arc BC having the vertexes B and C is determined. In addition, a direction extending from the one point on the virtual auxiliary line to the guiding reference point is calculated as the eye-flow guiding direction.

In the rectangular image object shown in FIG. 36B, a point M on the circular arc FGH having the three vertexes F to H is determined. In addition, a direction extending from the one point on the virtual auxiliary line to the guiding reference point is calculated as the eye-flow guiding direction.

In the wedge-shaped image object shown in FIG. 36C, a point N on the circular arc JL having the two vertexes J and L is determined. In addition, a direction extending from the one point on the virtual auxiliary line to the guiding reference point is calculated as the eye-flow guiding direction.

In addition, the bosom distance is calculated from the coordinate of the guiding reference point and the determined coordinate of the one point on the virtual auxiliary line.

In the triangular image object shown in FIG. 36A, the distance of a line segment DA, which is indicated by a solid line in FIG. 36A, is calculated from the coordinate of the guiding reference point A and the coordinate of the point D on the circular arc BC.

Further, in the rectangular image object shown in FIG. 36B, the distance of a line segment ME, which is indicated by a solid line in FIG. 36B, is calculated from the coordinate of the guiding reference point E and the coordinate of the point M on the circular arc FGH.

Furthermore, in the wedge-shaped image object shown in FIG. 36C, the distance of a line segment NI, which is indicated by a solid line in FIG. 36C, is calculated from the coordinate of the guiding reference point I and the coordinate of the point N on the circular arc JL.

In such a manner, the eye-flow guiding directions and the eye-flow guiding intensities with respect to the image objects shown in FIGS. 36A to 36C are obtained, respectively.

Next, the operation of the present exemplary embodiment will be described.

In the layout device 100, with going through the steps S300 and S302, vector image data is read, and based on the read vector image data, the vertexes of the respective image objects are detected as the guiding reference points.

And then, with going through the step S304, for every guiding reference point, an auxiliary line passing through a vertex other than the guiding reference point of the image object is virtually formed, and the direction extending from the one point on the virtual auxiliary line to the guiding reference point is calculated as the eye-flow guiding direction. Further, with going through the step S306, for every guiding reference point, the bosom distance is calculated as the eye-flow guiding intensity.

Then, with going through the step S308, for every guiding reference electrode, the representative eye-flow guiding level is calculated by performing vector composition on the calculated eye-flow guiding direction and eye-flow guiding intensity.

In such a manner, in the present exemplary embodiment, the bosom distance from the guiding reference point is calculated as the eye-flow guiding intensity.

The more an angle of the vertex of the image object 10 is sharpened, the more the eye-flow tends to be guided. Further, the more the angle of the vertex is sharpened, the larger the bosom distance is. Therefore, it is possible to calculate the eye-flow guiding intensity depending on the angle of the vertex of the image object 10. Thus, it is possible to relatively suitably calculate in which direction the image object 10 tends to guide the eye-flow.

In the sixth exemplary embodiment, the step S302 corresponds to the guiding reference point detecting device of any one of the exemplary embodiments 2 to 4, or the guiding reference point detecting of any one of the exemplary embodiments 11 to 13 and 20 to 22, and the steps S304 and S306 correspond to the eye-flow guiding level calculating device of the exemplary embodiment 2 or 4, or the eye-flow guiding level calculating of the exemplary embodiment 11, 13, 20, or 22. Further, the step S304 corresponds to the eye-flow guiding direction calculating device of the exemplary embodiment 4 or 5, or the eye-flow guiding direction calculating of the exemplary embodiment 13, 14, 22, or 23, and the step S306 corresponds to the eye-flow guiding intensity calculating device of the exemplary embodiment 4 or 7, or the eye-flow guiding intensity calculating of the exemplary embodiment 13, 16, 22, or 25. Further, the step S308 corresponds to the representative eye-flow guiding level calculating device of the exemplary embodiment 2, or the representative eye-flow guiding level calculating of the exemplary embodiment 11 or 20.

Moreover, in the first or second exemplary embodiment, the central distance or bosom distance from the guiding reference point is calculated as the eye-flow guiding intensity, but the present invention is not limited to this construction. For example, the angle of the vertex of the image object 10 may be calculated as the eye-flow guiding intensity.

The more the angle of the vertex of the image object 10 is sharpened, the more the eye-flow tends to be guided. Therefore, it is possible to relatively suitably calculate in which direction the image object 10 tends to guide the eye-flow.

In addition, the central distance or bosom distance from the guiding reference point or the angle of the vertex is weighted, and the sum of the weighted values may be calculated as the eye-flow guiding intensity.

Further, in the first to third exemplary embodiments, the case in which the image object 10 is formed in a right-angled triangle is described, but the present invention is not limited to this construction. Even though the image object 10 has other triangular shapes, a polygonal shape more than a rectangular or other geometrical shapes, the eye-flow guiding direction and the eye-flow guiding intensity can be calculated by means of the same method as those of the first to third exemplary embodiments.

Further, in the first to third exemplary embodiments, the eye-flow guiding direction and the eye-flow guiding intensity of the image object 10 are calculated, but the present invention is not limited to this construction. As regards characters or other symbols, if they are considered as an image one by one or collectively, the eye-flow guiding direction and the eye-flow guiding intensity can be calculated by means of the same method as those of the first to third exemplary embodiments.

Further, in the first to third exemplary embodiments, the eye-flow guiding level calculating system, the eye-flow guiding level calculating program, and the eye-flow guiding level calculating method according to exemplary embodiments of the present invention are applied to the case in which the direction and intensity of guiding the eye-flow of the image object 10 are calculated. However, the present invention is not limited to this case, and can be applied to other cases within a scope without departing from the subject matter of the present invention.

Further, in the fourth to sixth exemplary embodiments, the central distance or bosom distance from the guiding reference point is calculated as the eye-flow guiding intensity. However, the present invention is not limited this construction, and the angle of the vertex of the image object 10 may be calculated as the eye-flow guiding intensity.

The more the angle of the vertex of the image object 10 is sharpened, the more the eye-flow tends to be guided. Therefore, it is possible to relatively suitably calculate in which direction the image object 10 tends to guide the eye-flow.

In addition, the central distance or bosom distance from the guiding reference point or the angle of the vertex is weighted, and the sum of the weighted values may be calculated as the eye-flow guiding intensity.

Further, in the fourth and fifth exemplary embodiments, the case in which the image object 10 is formed in a right-angled triangle is described, but the present invention is not limited to this construction. Even though the image object 10 has other triangular shapes, a polygonal shape more than a rectangular or other geometrical shapes, the eye-flow guiding direction and the eye-flow guiding intensity can be calculated by means of the same method as those of the fourth and fifth exemplary embodiments.

Further, in the fourth to sixth exemplary embodiments, the eye-flow guiding direction and the eye-flow guiding intensity of the image object 10 are calculated, but exemplary embodiments of the present invention are not limited to this construction. With regards to characters or other symbols, if they are considered as an image one by one or collectively, the eye-flow guiding direction and the eye-flow guiding intensity can be calculated by the same method as those of the fourth to sixth exemplary embodiments.

Further, in the fourth to sixth exemplary embodiments, the guiding reference point is set at the vertex of the image object. However, exemplary embodiments of the present invention are not limited to this construction. For example, as shown in FIGS. 37A and 37B, the guiding reference point may be set in the vicinity of the vertex of the image object.

Figure 37A:
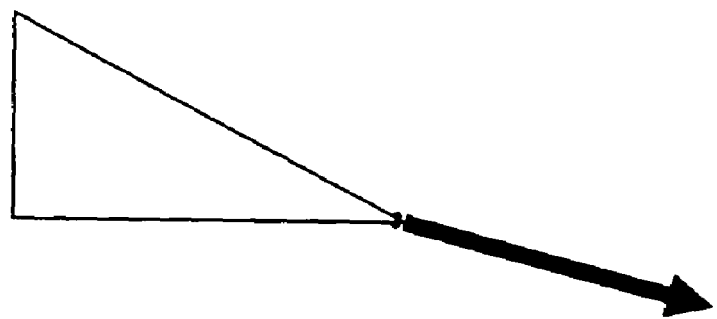
FIGS. 37A and 37B are schematic diagrams showing a case in which a guiding reference point is set in the vicinity of a vertex of an image object.
Figure 37B:
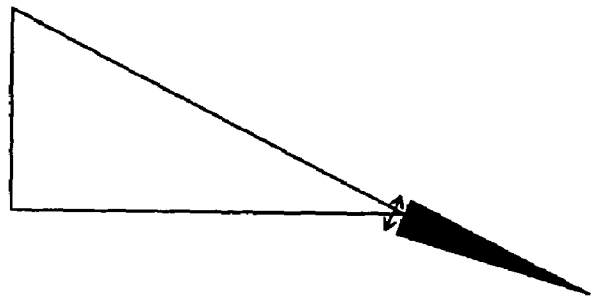

FIGS. 37A and 37B are diagrams showing a case in which a guiding reference point is set in the vicinity of a vertex of an image object.

As shown in FIG. 37A, in the case in which the eye-flow guiding intensity is represented by the length, thickness, and direction of an arrow, the guiding reference point may be set in the range of a line width of the arrow contacting the vertex. Further, as shown in FIG. 37B, when the eye-flow guiding intensity is represented by the length and thickness of a triangle and the direction of a vertex of an acute angle, the guiding reference point may be set in the range of a width of a sideline of the triangle which represents the eye-flow guiding intensity contacting a vertex of an image object corresponding to the guiding reference point.

Further, in the first to third exemplary embodiments, in executing the processes shown in the flow charts of FIGS. 2 and 20, the case in which the control program stored in the ROM 32 is executed is described, but exemplary embodiments of the present invention are not limited to this construction. For example, the program indicating the sequence of the processes may be stored in a storage medium, and then the program may read from the storage medium to the RAM 34.

Further, in the fourth to sixth exemplary embodiments, in executing the processes shown in the flow chart of FIG. 29, the case in which the control program stored in the ROM 32 is executed is described, but exemplary embodiments of the present invention are not limited to this construction. For example, the program indicating the sequence of the processes may be stored in a storage medium, and then the program may read from the recording medium to the RAM 34.

Figure 38:
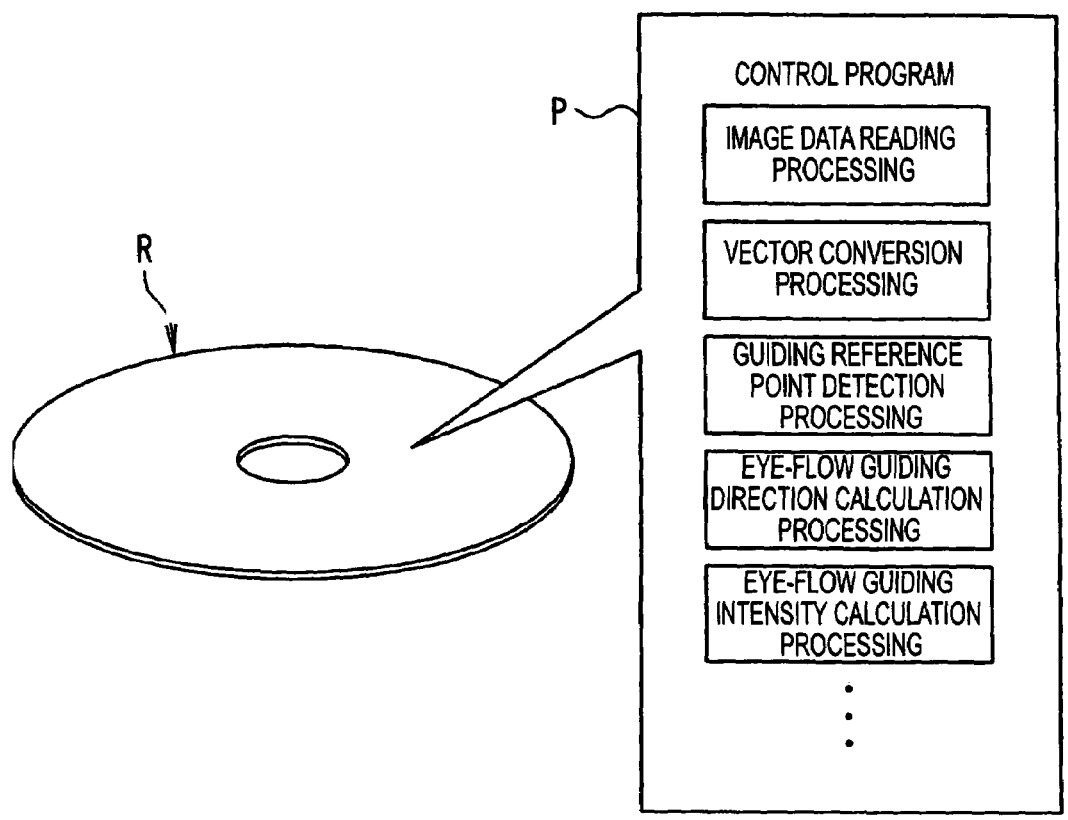
FIG. 38 is a schematic conceptional diagram showing an example of a computer-readable storage medium in which a control program is recorded.

Here, as the storage medium, a semiconductor recordable storage medium, such as RAM or ROM, a magnetic storage medium, such as FD or HD, an optical readable storage medium, such as CD, CDV, LD or DVD, and a magnetic recordable/optical readable storage medium, such as MO, may be included. Further, regardless of a reading method, such as an electronic, magnetic, or optical reading method, all the computer-readable storage media are included. FIG. 38 shows a CD-ROM, which is a computer-readable storage medium R. In the storage medium R composed of the CD-ROM, a control program P for realizing exemplary embodiments of the present invention using a computer system is stored.

Further, in the fourth to sixth exemplary embodiments, the eye-flow guiding level calculating system, the eye-flow guiding level calculating program, and the eye-flow guiding level calculating method according to exemplary embodiments of the present invention are applied to the case in which the direction and the intensity of guiding the eye-flow of the image object 10 are calculated. However, exemplary embodiments of the present invention are not limited to this case, and can be applied to other cases within a scope without departing from the subject matter of the present invention.

What is claimed is:

1. An eye-flow guiding level calculating system in which, based on image data constituting an image, a degree of guiding an eye-flow of the image is calculated, the system comprising:
    a guiding reference point detecting device to detect, based on the image data, a guiding reference point serving as a reference which guides the eye-flow from the image; and
    an eye-flow guiding level calculating device to calculate an eye-flow guiding level indicating the degree of guiding of the eye-flow with respect to the guiding reference point detected by the guiding reference point detecting device, wherein
    the eye-flow guiding level calculating device having an eye-flow guiding direction calculating device to calculate an eye-flow guiding direction, which is a direction of guiding the eye-flow, with respect to the guiding reference point detected by the guiding reference point detecting device, and an eye-flow guiding intensity calculating device to calculate an eye-flow guiding intensity, which is the intensity of guiding the eye-flow, with respect to the guiding reference point detected by the guiding reference point detecting device,
    in an image object, which is formed to include a vertex of an image serving as the guiding reference point or a vertex of an image in the vicinity of the guiding reference point, an auxiliary line is formed to pass through a vertex other than the vertex serving as the guiding reference point or other than the vertex in the vicinity of the guiding reference point, the eye-flow guiding intensity calculating device calculating the eye-flow guiding intensity based on a distance from one point on the virtual auxiliary line up to the guiding reference point.

2. The eye-flow guiding level calculating system according to claim 1,
    the guiding reference point detecting device detecting a vertex of a projection or its vicinity in the image as the guiding reference points, based on the image data.

3. The eye-flow guiding level calculating system according to claim 1,
    that two auxiliary lines are formed to intersect the guiding reference point or its vicinity along an edge of the image passing through the guiding reference point or its vicinity, the eye-flow guiding direction calculating device calculating the eye-flow guiding direction based on a central direction of an obtuse angle among angles made by the virtual auxiliary lines.

4. The eye-flow guiding level calculating system according to claim 1,
    the eye-flow guiding intensity calculating device calculating the eye-flow guiding intensity based on a distance from a center of an image object having an outline formed to include the edge of the image passing through the guiding reference point or its vicinity up to the guiding reference point.

5. The eye-flow guiding level calculating system according to claim 1,
    two auxiliary lines are formed to intersect the guiding reference point or its vicinity along the edge of an image passing through the guiding reference point or its vicinity, the eye-flow guiding intensity calculating device calculating the eye-flow guiding intensity based on a distance, up to the guiding reference point, from a point at which a bisector line of an acute angle among angles which the virtual auxiliary lines make intersects an outer line of an image object whose outline is formed to include the edge.

6. The eye-flow guiding level calculating system according to claim 1,
    two auxiliary lines are formed to intersect the guiding reference point or its vicinity along the edge of an image passing through the guiding reference point or its vicinity, the eye-flow guiding intensity calculating device calculating the eye-flow guiding intensity based on angles made by the virtual auxiliary lines.

7. An eye-flow guiding level calculating system in which, based on image data constituting an image, a degree of guiding an eye-flow of the image is calculated, the system comprising:
    a guiding reference point detecting device to detect, based on the image data, a plurality of guiding reference points serving as references which guide the eye-flow from the image;
    an eye-flow guiding level calculating device to calculate an eye-flow guiding level indicating the degree of guiding of the eye-flow for every guiding reference point detected by the guiding reference point detecting device, wherein
    the eye-flow guiding level calculating device having an eye-flow guiding direction calculating device to calculate an eye-flow guiding direction, which is a direction of guiding the eye-flow, with respect to the guiding reference point detected by the guiding reference point detecting device, and an eye-flow guiding intensity calculating device to calculate an eye-flow guiding intensity, which is the intensity of guiding the eye-flow, with respect to the guiding reference point detected by the guiding reference point detecting device, in an image object, which is formed to include a vertex of an image serving as the guiding reference point or a vertex of an image in the vicinity of the guiding reference point, an auxiliary line is formed to pass through a vertex other than the vertex serving as the guiding reference point or other than the vertex in the vicinity of the guiding reference point, the eye-flow guiding intensity calculating device calculating the eye-flow guiding intensity based on a distance from one point on the virtual auxiliary line up to the guiding reference point; and a representative eye-flow guiding level calculating device to calculate a representative eye-flow guiding level representing the image based on the eye-flow guiding levels calculated by the eye-flow guiding level calculating device.

8. An eye-flow guiding level calculating program, recorded on a computer readable medium, for use with a computer in which, based on image data constituting an image, a degree of guiding an eye-flow of the image is calculated, the calculating program, comprising:

a guiding reference point detecting program for detecting, based on the image data, a guiding reference point serving as a reference which guides the eye-flow from the image; and an eye flow guiding level calculating program for calculating an eye-flow guiding level indicating the degree of guiding the eye-flow with respect to the guiding reference point detected in the guiding ,reference point detecting step, wherein the eye-flow guiding level calculating program having an eye-flow guiding direction calculating device to calculate an eye-flow guiding direction, which is a direction of guiding the eye-flow, with respect to the guiding reference point detected by the guiding reference point detecting device, and an eye-flow guiding intensity calculating device to calculate an eye-flow guiding intensity, which is the intensity of guiding the eye-flow, with respect to the guiding reference point detected by the guiding reference point detecting device, in an image object, which is formed to include a vertex of an image serving as the guiding reference point or a vertex of an image in the vicinity of the guiding reference point, an auxiliary line is formed to pass through a vertex other than the vertex serving as the guiding reference point or other than the vertex in the vicinity of the guiding reference point, the eye-flow guiding intensity calculating device calculating the eye-flow guiding intensity based on a distance from one point on the virtual auxiliary line up to the guiding reference point.

9. An eye-flow guiding level calculating program, recorded on a computer readable medium, for use with a computer, in which, based on image data constituting an image, a degree of guiding an eye-flow of the image is calculated, the calculating program, comprising:

a guiding reference point detecting program for, based on the image data, detecting a plurality of guiding reference points serving as references which guide the eye-flow from the image;

an eye-flow guiding level calculating program for calculating an eye-flow guiding level indicating the degree of guiding the eye-flow for every guiding reference point detected in the guiding reference point detecting, wherein the eye-flow guiding level calculating program having an eye-flow guiding direction calculating device to calculate an eye-flow guiding direction, which is a direction of guiding the eye-flow, with respect to the guiding reference point detected by the guiding reference point detecting device, and an eye-flow guiding intensity calculating device to calculate an eye-flow guiding intensity, which is the intensity of guiding the eye-flow, with respect to the guiding reference point detected by the guiding reference point detecting device, in an image object, which is formed to include a vertex of an image serving as the guiding reference point or a vertex of an image in the vicinity of the guiding reference point, an auxiliary line is formed to pass through a vertex other than the vertex serving as the guiding reference point or other than the vertex in the vicinity of the guiding reference point, the eye-flow guiding intensity calculating device calculating the eye-flow guiding intensity based on a distance from one point on the virtual auxiliary line up to the guiding reference point and a representative eye-flow guiding level calculating program for calculating a representative eye-flow guiding level representing the image based on the eye-flow guiding levels calculated in the eye-flow guiding level calculating.

10. An eye-flow guiding level calculating method, in which, based on image data constituting an image, a degree of guiding an eye-flow of the image is calculated, the method comprising:

detecting based on the image data, a guiding reference point serving as a reference which guides the eye-flow from the image; and calculating an eye-flow guiding level indicating the degree of guiding the eye-flow with respect to the guiding reference point detected in the guiding reference point detecting, wherein the eye-flow guiding level calculating method having an eye-flow guiding direction calculating device to calculate an eye-flow guiding direction, which is a direction of guiding the eye-flow, with respect to the guiding reference point detected by the guiding reference point detecting device, and an eye-flow guiding intensity calculating device to calculate an eye-flow guiding intensity, which is the intensity of guiding the eye-flow, with respect to the guiding reference point detected by the guiding reference point detecting device in an image object, which is formed to include a vertex of an image serving as the guiding reference point or a vertex of an image in the vicinity of the guiding reference point, an auxiliary line is formed to pass through a vertex other than the vertex serving as the guiding reference point or other than the vertex in the vicinity of the guiding reference point, the eye-flow guiding intensity calculating device calculating the eye-flow guiding intensity based on a distance from one point on the virtual auxiliary line up to the guiding reference point.

11. An eye-flow guiding level calculating method, in which, based on image data constituting an image, a degree of guiding an eye-flow of the image is calculated, the method comprising:

detecting based on the image data, a plurality of guiding reference points serving as references which guide the eye-flow from the image;

calculating an eye-flow guiding level indicating the degree of guiding the eye-flow for every guiding reference point detected in the guiding reference point detecting, wherein the eye-flow guiding level calculating method having an eye-flow guiding direction calculating device to calculate an eye-flow guiding direction, which is a direction of guiding the eye-flow, with respect to the guiding reference point detected by the guiding reference point detecting device, and an eye-flow guiding intensity calculating device to calculate an eye-flow guiding intensity, which is the intensity of guiding the eye-flow, with respect to the guiding reference point detected by the guiding reference point detecting device, in an image object, which is formed to include a vertex of an image serving as the guiding reference point or a vertex of an image in the vicinity of the guiding reference point, an auxiliary line is formed to pass through a vertex other than the vertex serving as the guiding reference point or other than the vertex in the vicinity of the guiding reference point, the eye-flow guiding intensity calculating device calculating the eye-flow guiding intensity based on a distance from one point on the virtual auxiliary line up to the guiding reference point and calculating a representative eye-flow guiding level, representing the image based on the eye-flow guiding levels calculated in the eye-flow guiding level calculating.

* * * * *